United States Patent [19]

Modisette

[11] 4,239,395
[45] Dec. 16, 1980

[54] RADIOGRAPHIC IMAGING SYSTEM QUALITY MONITOR

[76] Inventor: James E. Modisette, 12108 Radium, San Antonio, Tex. 78216

[21] Appl. No.: 931,589

[22] Filed: Aug. 7, 1978

[51] Int. Cl.³ ............................................. G01N 21/01
[52] U.S. Cl. ..................... 356/443; 250/322
[58] Field of Search ............... 356/443, 444; 250/322; 354/297, 298, 20

[56] References Cited

U.S. PATENT DOCUMENTS

| | | | |
|---|---|---|---|
| 2,296,048 | 9/1942 | Planskoy | 354/298 |
| 2,478,406 | 8/1949 | Lamb | 356/443 |
| 3,528,749 | 9/1970 | Bowker | 356/443 |
| 3,624,724 | 11/1971 | Sheffer | 354/20 |
| 3,995,959 | 12/1976 | Shaber | 356/443 |

FOREIGN PATENT DOCUMENTS 1319786  6/1973  United Kingdom ..................... 354/298

OTHER PUBLICATIONS

Lawrence, D. J., "A Simple Method of Processor Control", Medical Radiography and Photography, vol. 49, No. 1, pp. 2-6, 28, 1973.
ANSI Ph 2.19-1976, "Conditions for Diffuse and Doubly Diffuse Transmission Measurements".
Eastman Kodak, "Sensitometric Properties of X-Ray Films", Radiography Markets Div., Rochester, N.Y., 14650.
Weston Electric Inst. Co. Engineering Notes, vol. 4, No. 3, Jul. 1949, "Densitometers and Their Use in Technology, Medicine, and Commerce".

*Primary Examiner*—John K. Corbin
*Assistant Examiner*—Bruce Y. Arnold
*Attorney, Agent, or Firm*—Arthur M. Dula

[57] ABSTRACT

The present invention is an apparatus and a method for using the apparatus to maintain quality control over a radiographic imaging system by precisely exposing two areas of a film to even illumination from a light source attenuated by different precisely known amounts. Both exposures are chosen to fall on the linear portion of the film's density-log exposure curve. The film is developed and the densities of the exposed areas are sensed photometrically. The film's base plus fog density, gamma and "processor quality factor" (which is a measure of the sensed film's deviation from the gamma and speed of a reference film processed in a reference processor) are automatically calculated. The processor quality factor allows faulty radiographic technique to be detected apart from faulty film or faulty processing without re-exposing the patient to additional radiation.

12 Claims, 17 Drawing Figures

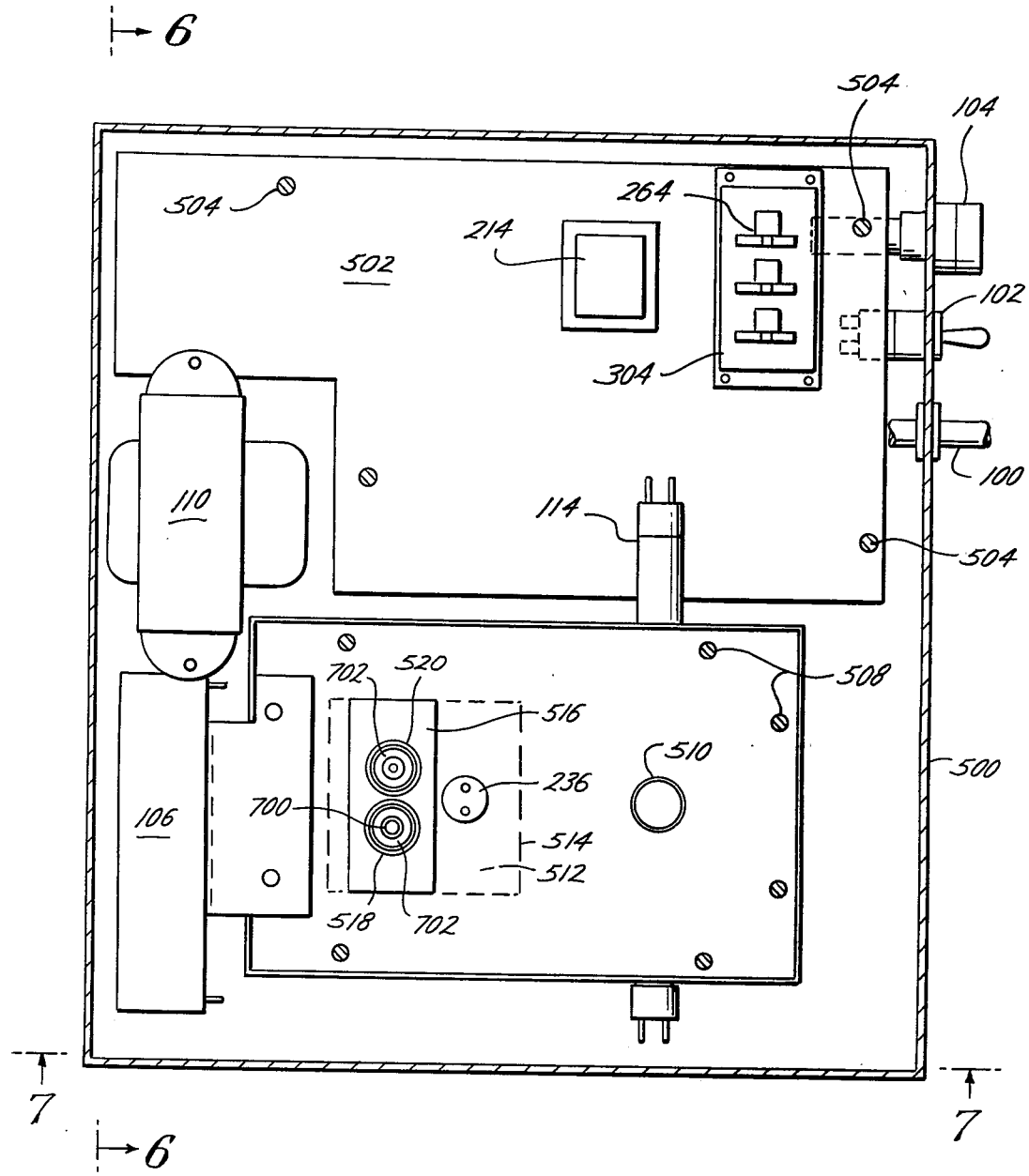

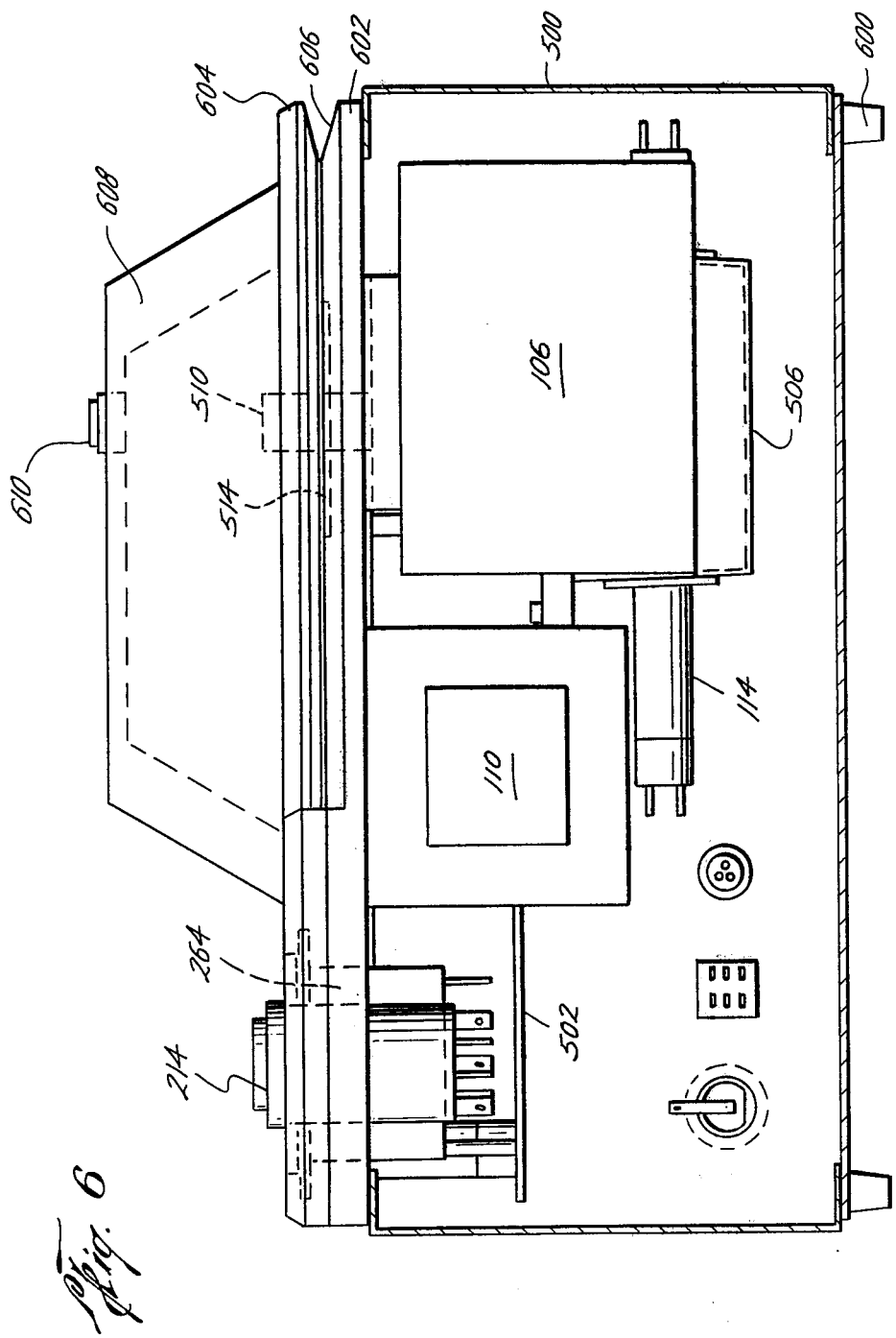

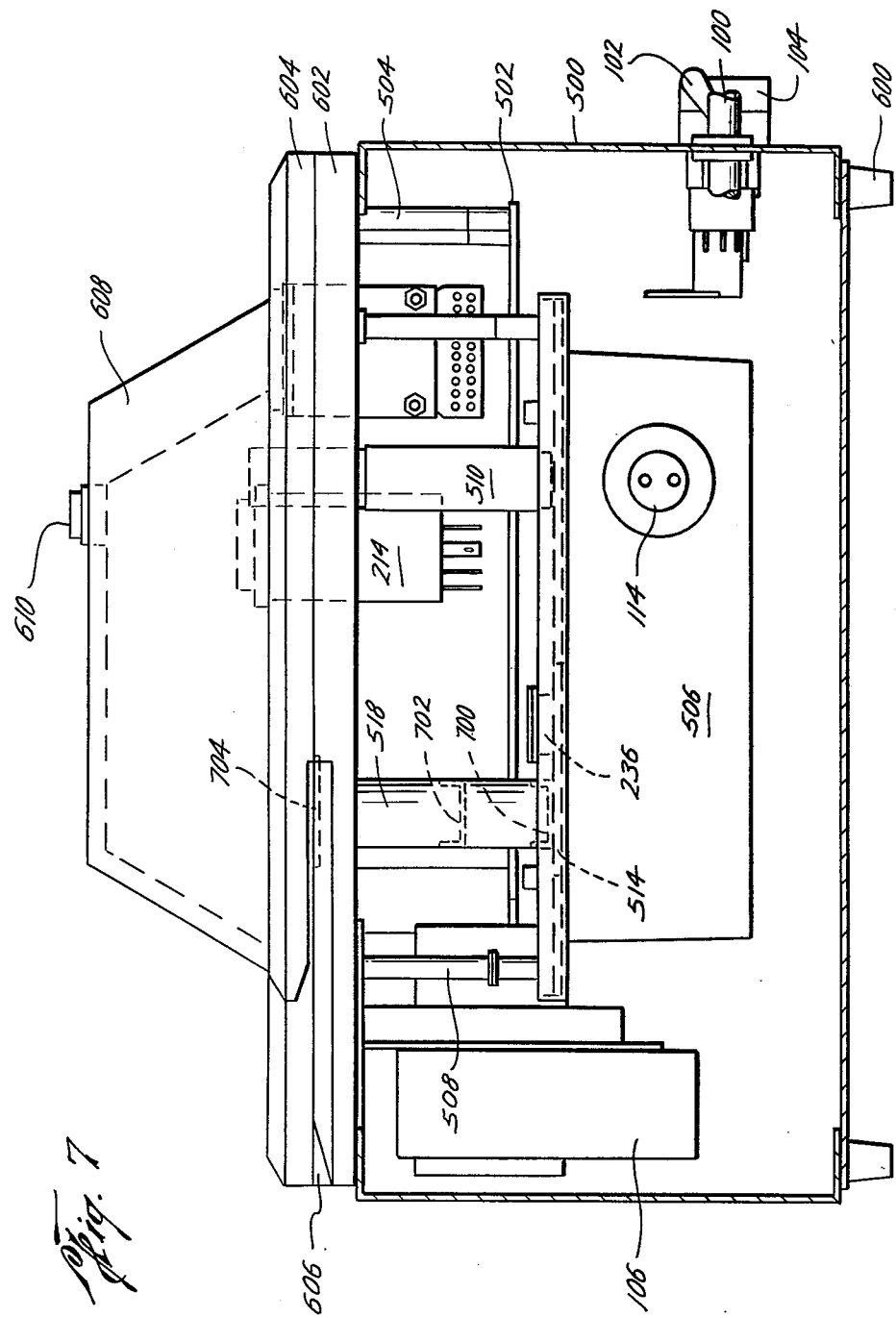

| ADDRESS CODE E D C B A | SECOND DIGIT "Y" | $10^{1 \cdot Y}$ | EQUIVALENT DECIMAL NUMBER IN BINARY | BINARY NUMBER | |
|---|---|---|---|---|---|
| 0 0 0 0 0 | 0 | 10.00 | 1000 | 0 0 0 0 0 0 1 1 | 1 1 1 0 1 0 0 0 |
| 0 0 0 0 1 | .1 | 12.59 | 1259 | 0 0 0 0 0 1 0 0 | 1 1 1 0 1 0 1 1 |
| 0 0 0 1 0 | .2 | 15.85 | 1585 | 0 0 0 0 0 1 1 0 | 0 0 1 1 0 0 0 1 |
| 0 0 0 1 1 | .3 | 19.95 | 1995 | 0 0 0 0 0 1 1 1 | 1 1 0 0 1 0 1 1 |
| 0 0 1 0 0 | .4 | 25.12 | 2512 | 0 0 0 0 1 0 0 1 | 1 1 0 1 0 0 0 0 |
| 0 0 1 0 1 | .5 | 31.62 | 3162 | 0 0 0 0 1 1 0 0 | 0 1 0 1 1 0 1 0 |
| 0 0 1 1 0 | .6 | 39.81 | 3981 | 0 0 0 0 1 1 1 1 | 1 0 0 0 1 1 0 1 |
| 0 0 1 1 1 | .7 | 50.12 | 5012 | 0 0 0 1 0 0 1 1 | 1 0 0 1 0 1 0 0 |
| 0 1 0 0 0 | .8 | 63.10 | 6310 | 0 0 0 1 1 0 0 0 | 1 0 1 0 0 1 1 0 |
| 0 1 0 0 1 | .9 | 79.43 | 7943 | 0 0 0 1 1 1 1 1 | 0 0 0 0 0 1 1 1 |
| | | | | $Y_1 Y_2 Y_3 Y_4 Y_5 Y_6 Y_7 Y_8$ | $Y_1 Y_2 Y_3 Y_4 Y_5 Y_6 Y_7 Y_8$ |
| | | | | A Prom Outputs | B Prom Outputs |

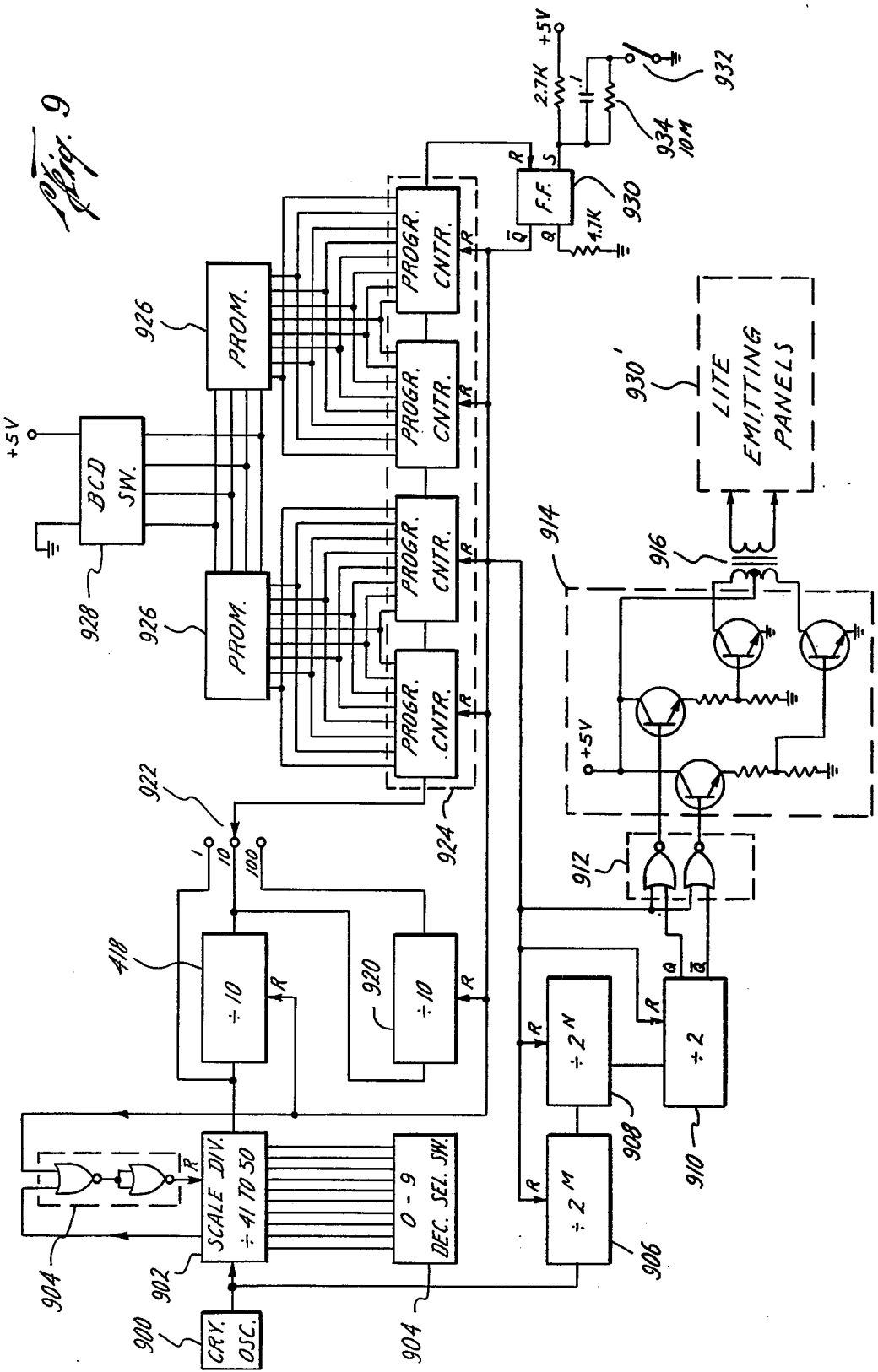

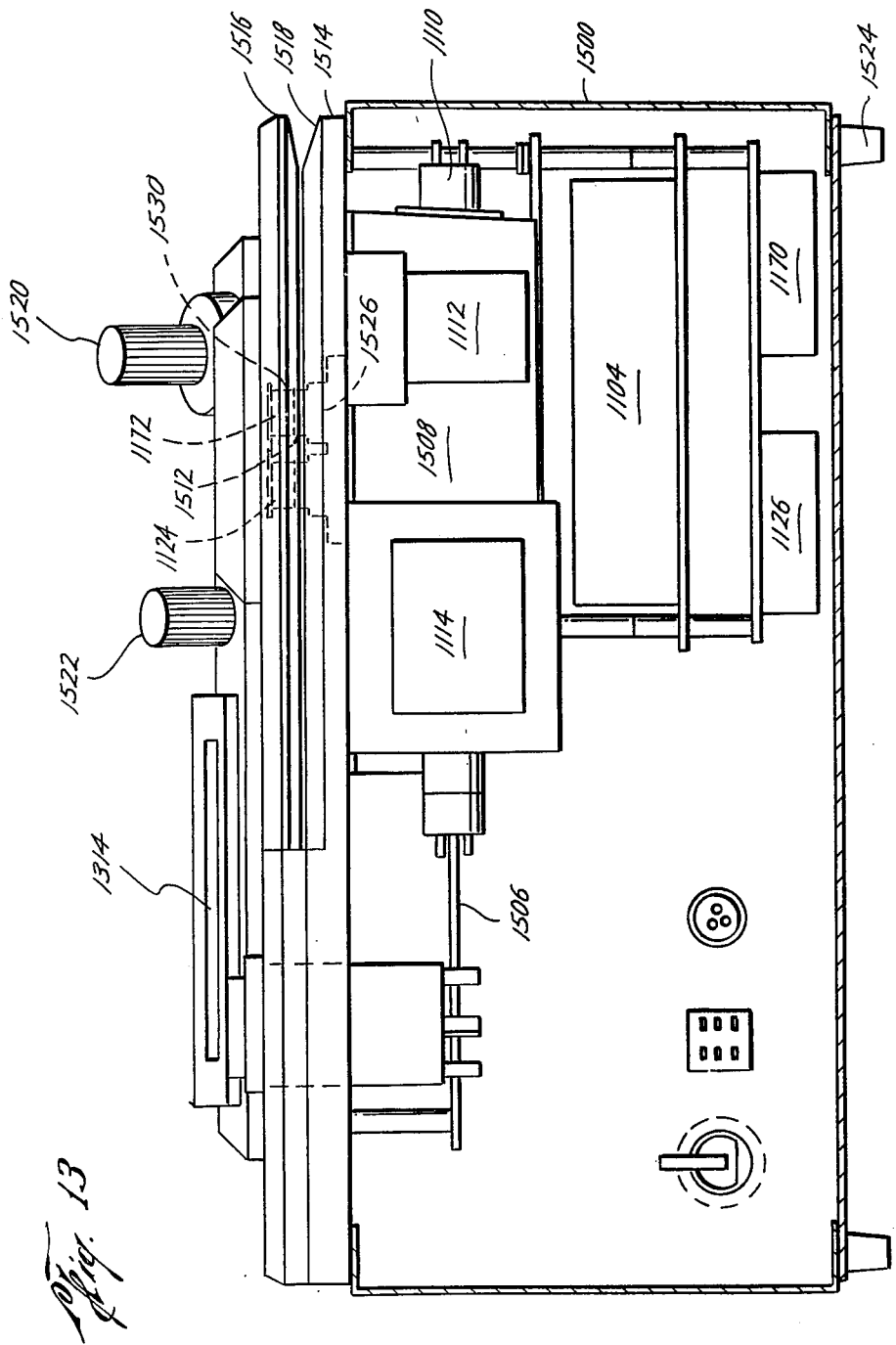

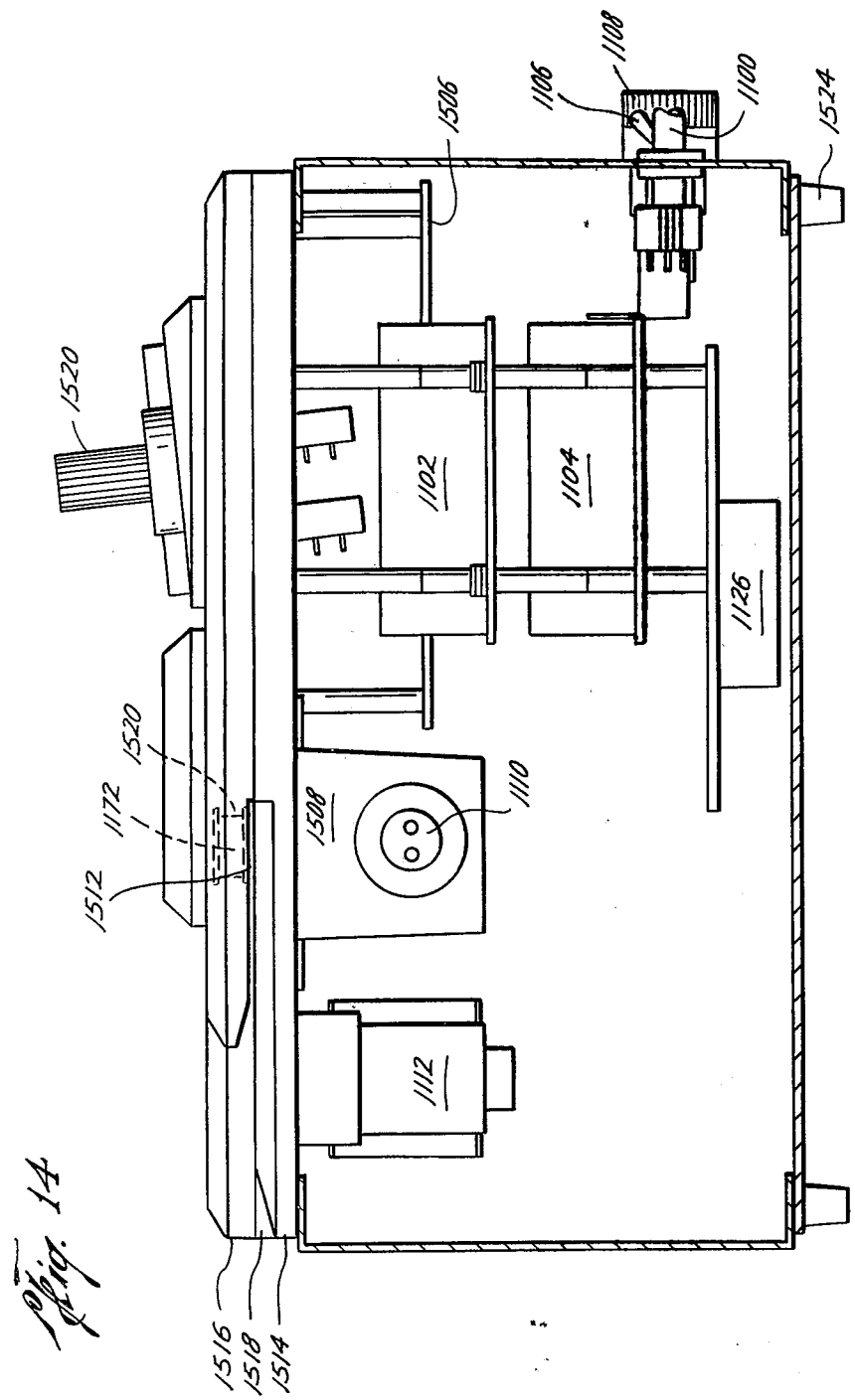

RADIOGRAPHIC IMAGING SYSTEM QUALITY MONITOR

RELATED APPLICATIONS

This application is an improvement on co-pending application Ser. No. 639,997, now abandoned.

BACKGROUND OF THE INVENTION

1. Field of the Invention

The present invention relates generally to use of photometric exposure and measurement to monitor and control quality of radiographic images. More specifically, the present invention relates to a method and apparatus for producing and sensing at least two optical densities generated on photo sensitive material by exposing said material to two sources of even illumination at a correct frequency. The two intensities differ by a precise, known amount. The apparatus determines density, gamma, base plus fog and the process quality factor of the film.

2. Background and Prior Art

It has long been known in the art of film processing to precisely expose a piece of film, process the film, and then measure the optical density of the exposed area.

Instruments for exposing photographic material to the series of graduated light intensities or for precisely known periods are called "sensitometers". They generally consist of a light source of known intensity and a means for producing exposures that differ by known amounts.

Several types of sensitometers are well known to the prior art. Exposure may be varied by controlling either light intensity or exposure time. One method used is a rotating sector wheel that allows light to pass for a smaller period of time as distance from its axis of rotation increases; another uses areas of differing density between a precise amplitude light source and photosensitive material, which produces a step-wedge. Many variations exist of these instruments, but their general operation is similar, variations being only for application to a specific job.

Once the exposed film is developed, a device called a "densitometer" is utilized to measure the optical density of the exposed area. To properly understand the present invention it must be understood at the onset that all precision densitometers taught by the prior art require the use of complex optical systems. These complex optical systems are required to precisely control the amount and type of light emerging from the sensed film. See, for example, FIG. A2 on page 14 of ANSI PH 2.19-1976, "Conditions for diffuse and doubly diffuse transmission measurements" (copy attached).

Density is properly defined by the equation:

$$\text{density} = \log (I_o/I_t)$$

where $I_o$ is the light incident on the sample and $I_t$ is the light transmitted. Thus the measure of density is fundamentally a comparison of two light intensities. However, the silver deposits which form the image on a photographic or radiographic film scatters light as well as absorbs it. Therefore, the actual numerical value of the density of a particular area of film will depend on the method by which it is measured.

If a totally parallel beam of light falls on a processed film, only part of the light is absorbed by the silver in the film. A second part passes through in the same direction as the transmitted beam and a third part is scattered. Use of specular light input and diffuse light output by conventional densitometers requires the use of a complex optical system that is very sensitive to optical geometry, i.e. changes in the sensed film position in the optical path. This makes measurement of density difficult to accomplish with any substantial degree of precision as a repeatable value from instrument to instrument.

In discussing this problem, the Radiographic Markets Division of Eastman Kodak states, at page 29 of "Sensitometric Properties of X-Ray Films" (copy attached), "It is, therefore, not surprising that if the same film area is read on a number of different densitometers, the numerical results will differ somewhat, since densitometers differ somewhat in optical design. Variations from one type of commercial densitometer to another will in general be small, but the possibility must be kept in mind when planning precision work." (page 29)

The complex optical systems of commercial densitometers cost thousands of dollars. It is technically infeasible, as well as economically impossible, to build this type of precision measuring equipment into apparatus for use for routine quality control in normal clinical radiography. Further, even if built, such conventional equipment would be so sensitive to film position that it would have to be operated by a skilled technician to obtain consistant results.

The purpose of obtaining accurate density measurements is to enable the operator to generate a curve, known as the "H&D" curve or the density-log exposure (D-log E curve); to measure the speed of the film, and to evaluate processor performance by comparing this information against a standard.

The D-log E curve comprises three parts: a toe, a straight line portion and a shoulder. The toe is a region of underexposure. Changes of exposure in this area have little effect on developed optical density. The curve's shoulder is a region of overexposure. Again, changes in exposure cause only small changes in density. The curve's straight line portion is the region of correct exposure. In this straight line portion, optical density of the developed film is a direct function of the logarithm of exposure.

Persons skilled in the art of sensitometry plot D-log E curves to obtain a value known as "gamma". Gamma may be represented geometrically by the tangent of the angle formed by a line tangent to the straight line portion of the D-log E curve and the curve's exposure axis. Gamma is a measure of film contrast. For any particular film type there will be a characteristic family of gamma curves that indicate different film speeds, or developed densities, for a given exposure. If exposure is held constant, each curve represents a change in processor variables, i.e. time, temperature and/or processor chemistry. This is another way of saying that film speed or sensitivity is inversely proportional to exposure time required to achieve a specific developed density. Thus, at a fixed relative exposure, any change in density will reflect a change in speed; which is also a function of processor variables.

It is therefore possible to calculate change from a reference standard in the value of gamma and speed, for a fixed exposure, solely as a function of film and processor variables. The optimal value of gamma, speed and base-plus-fog for a given film indicates the film was correctly processed and thus has the optimum combination of contrast, resolution and base-plus-fog for that particular film type. Conversely, a deviation in speed or gamma indicates the film was processed incorrectly and will produce an image of poor diagnostic quality.

As a result of this known relationship between the value of gamma, film speed and the quality of the film processor, gamma and developed density (speed change) are sensitive and useful indicators for determining the optimum operating point for film processing systems.

It will readily be appreciated that the prior art has a number of shortcomings. The precision densitometers required by the prior art to determine density are expensive and delicate. Such instruments are prone to break down and tend to become inaccurate after a period of time, thus necessitating expensive recalibration.

Another drawback of the prior art is the requirement that measurement of a precise optical density requires significant use of highly trained manpower. A trained technician first has to carefully obtain a number of precise density readings and then calculate the gamma of the film. As a result, gamma measurements tended to be taken seldom, usually only at the beginning of an operating day on a given processor, and are repeated only when it becomes grossly obvious to the radiologist that a processor is not performing well.

This last drawback has very serious implications for the public health. Every hospital of significant size in the United States has a number of fully automatic x-ray film processors. The film processed in these units is exposed by passing a dose of x-ray radiation through a patient. The film is then processed by a technician in an automatic film processor. If the processor does not work optimally, the result is a poor quality image on the x-ray film. Unfortunately a similar poor quality image is produced if the x-ray was improperly exposed due to a mistake in radiographic technique, i.e. a wrong setting of kilovoltage, or x-ray current, or time of exposure.

For the purpose of the present invention this means quality of medical radiographs generally is a function of either:

1. Variables associated with the nature of the subject and the radiographic conditions under which the radiograph was exposed; or
2. Variables associated with the type of film/screens and the development process.

At the present time it is a normal procedure in most hospitals for the x-ray exposure to be repeated if a poor quality image is obtained. This exposes the patient to additional radiation, which is undesirable from a public health standpoint. Often the fact that the poor quality radiograph is due to processor errors rather than faulty x-ray exposure only becomes apparent after a patient has been x-rayed several times. It is also unfortunate that it is common practice in most hospitals for the radiology technician to increase the radiographic technique (increase the x-ray dose to the patient) to gain better film contrast in order to compensate for a poorly functioning processor. This practice has become common because there is never enough time or trained personnel available to use the quality control techniques taught by the prior art.

No prior art known to the inventor teaches precisely evaluating gamma and speed with sufficient accuracy in a short enough time to allow a routine measurement of processor quality, quality of film batches, or proper x-ray exposure to be made prior to re-exposing the patient.

It is therefore an object of the present invention to provide a means of measuring the density, speed change, gamma and processor quality of a radiographic film without requiring the use of precise, geometrically dependent optics.

It is a further object of the present invention to provide a means of measuring processor quality, evaluating film batch quality and checking on x-ray patient exposure that is sufficiently rapid and automatic that such measurements may be made on a routine basis by an unskilled person.

It is yet another purpose of the present invention to provide a means of measuring processor quality that is inexpensive and rugged.

It is yet a further object of the present invention to provide a quick and simple method of determining the processor quality and other sensitometric variables of every film exposed by a radiographic system; or, alternatively, to provide a quick and simple method for running test films at periodic intervals.

The closest prior art to the present invention known to the inventor is the system described in *Medical Radiography and Photography*, Vol. 49, No. 1, pp. 2–6, 28, 1973, entitled "A Simple Method of Processor Control", by Daniel J. Lawrence (copy attached).

SUMMARY OF THE PRESENT INVENTION

The present invention comprises a method of determining the density, speed change, gamma, and process quality factor of a radiograhic system and an apparatus that can practice this method.

The process comprises radiographically blocking a small area of the film before x-ray exposure, then exposing this area of the film to two extremely stable even light sources that has been precisely attenuated to produce two areas of illumination of known differing intensities. The intensity of the exposing sources is adjusted so both exposures fall within the straight line portion of the D-log E curve of the film being exposed.

After the film has been processed, the two areas of differing density are again illuminated by an even diffuse light source which has been corrected by a filter to have the same spectral radiance as would be the source used by a radiologist reading the film. The measured densities can be displayed directly or can be used to calculate speed change, gamma or a process quality factor, which is a measure of the deviation of both gamma and the change in speed of the sensed film from a reference standard. Base-plus-fog may also be measured by measuring the density of an unexposed portion of the film.

The apparatus taught by the present invention achieves even diffuse illumination by means of a radiant cavity having an offset phospor coated fluorescent tube. Two internally threaded and black anodized attenuating cylinders having internal baffles to prevent internal reflection illumination view a portion of the radiant cavity distant from the light source.

After processing, the precisely exposed portion of the x-ray film is placed in a reader. The film is aligned so the areas of differing density are between filtered sensors and a diffuse source of even illumination. Signals from the sensors are manipulated electrically to produce voltage outputs corresponding to the density of the two areas, film speed change, the gamma of the film and the process quality factor of the film.

In the normal day-to-day operation of radiology departments of medical clinics and hospitals the process quality factor (PQF reading) will be the most useful. The total process of using the invention, from exposing the two film areas to displaying the PQF reading, will generally require less than ten additional seconds per film. The invention will assure that the patient has received the minimum x-ray exposure dose required to produce the best diagnostic quality x-ray image.

BRIEF DESCRIPTION OF THE DRAWINGS

FIG. 5 is a top view of the flasher apparatus taught by the preferred embodiment of the present invention;

FIG. 6 is a view of the flasher apparatus taken along section lines 6—6 of FIG. 5;

FIG. 7 is a view of the flasher apparatus taken along section lines 7—7 of FIG. 5;

FIG. 9 is a digital block diagram of the electroluminescent version of the flasher apparatus taught by the preferred embodiment of the present invention;

FIG. 13 is a view of the reader apparatus taken along section lines 13—13 of FIG. 12;

FIG. 14 is a view of the reader apparatus of the present invention taken along section lines 14—14 of FIG. 12;

It should be understood that the present invention is applicable to any process that uses a sensitive material capable of forming a latent image that must subsequently be developed. Similarly, the concept of the present invention is not limited to any specific sensitive material.

DESCRIPTION OF THE PREFERRED EMBODIMENT

Background

Figure 1:
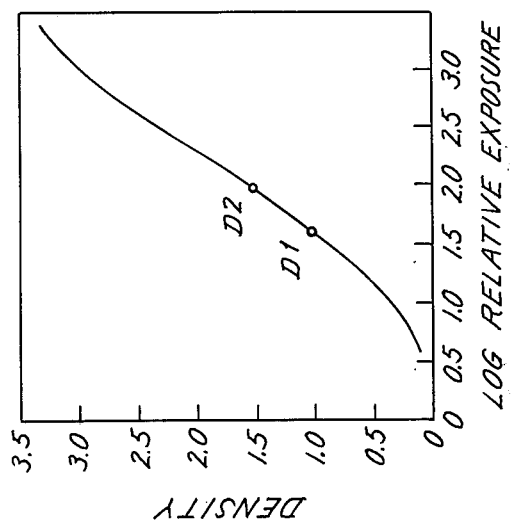
FIG. 1 is a typical D-log E curve for radiographic film.

FIG. 1 illustrates the D-log E curve of a typical x-ray plate. The scale on this drawing is arbitrary. The curve generally exhibits a linear portion. The source of light used by the present invention must only be adjusted so both exposures are within the linear portion of the D-log E curve.

Figure 2:
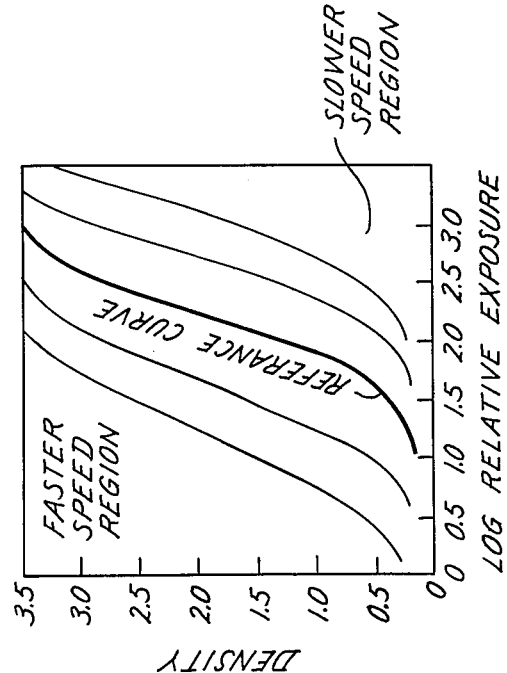
FIG. 2 is a family of D-log E curves generated by changing the film's speed and gamma by altering processor variables such as development time, temperature, and developer concentration.

FIG. 2 is a family of curves that illustrates change in gamma and speed of the film caused by differing processor conditions at a given exposure. Change in speed can be a sensitive indicator of processor quality.

Figure 3:
FIG. 3 is an example of the type of data sheet that might be used in the preferred embodiment of the present invention.

As shown in FIG. 3, the two differing density spots required to practice the present invention are located in the upper right hand side of the identification card. This portion of the film positioned over the ends of the light attenuator tubes of the present invention. When this identification plate is flashed this portion of the x-ray plate will form two areas in the latent film image that have a known difference in density.

Upon development, the part of the x-ray film corresponding to the two dots in FIG. 3, will have a known differential density. The two densities and the differential density can be used to calculate gamma and processor quality factor.

To the trained technician, the variables of gamma, change in speed and the reference densities are useful items of information. Taken together they allow the technician to diagnose faulty processor condition, film condition, or radiographic technique. However, for a relatively untrained operator, it is advantageous to combine these major variables so an unskilled processor operator can tell at a glance that processor quality is falling off or unacceptable.

The PQF (process quality factor) measurement made by the present invention, accomplishes the function of allowing the process operator to tell at a glance that processor quality is falling off or unacceptable. The basic variables used in the PQF equation are the measured gamma and speed of the sensed film, compared against a reference gamma and speed for this type of film developed in an optomized reference processor. The equation takes the form, $$PQF = K_1 \left| \frac{\text{gamma measured}}{\text{gamma reference}} - 1 \right| + K_2 \left| \frac{\text{density measured}}{\text{density reference}} - 1 \right|$$

$K_1$ and $K_2$ are weighing factors that sum to 100%. In the described embodiment $K_1$ and $K_2$ are equal.

The left hand term indicates change in gamma from reference and the right hand term indicates change in speed from reference. PQF is thus made a direct measure of the percentage deviation of the sensed film from reference conditions. In an optimal situation, the operator will read zero deviation. Zero deviation indicates there is no difference between reference gamma and speed and the gamma and speed actually measured. It has been found that use of this PQF measurement greatly facilitates use of the present invention. Limits may be set as to safe, acceptable, and unacceptable levels by the radiology department of the institution using the equipment.

THE FLASHER—ELECTRICAL DESCRIPTION

Figure 4A:
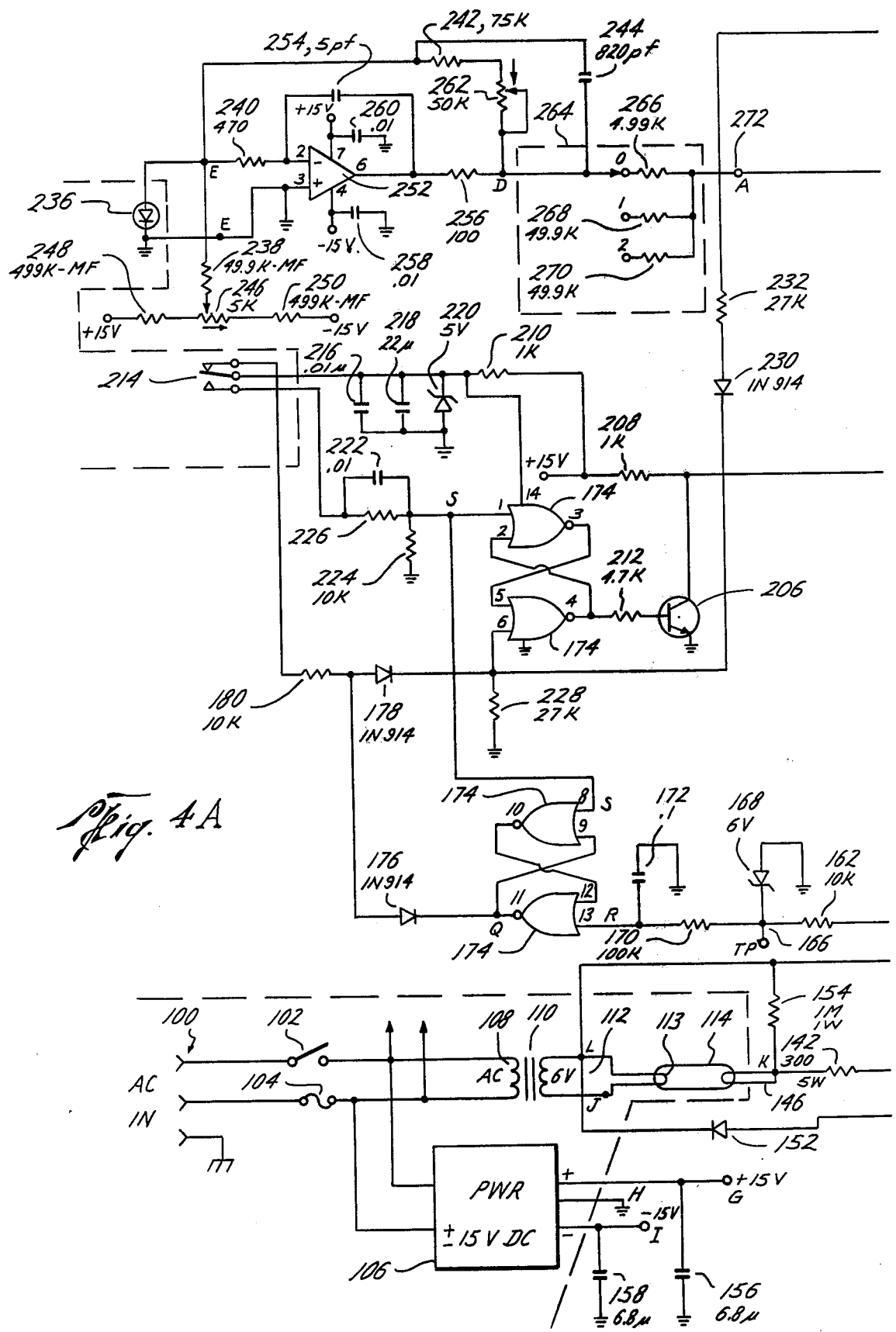
FIGS. 4A, 4B and 4C are an electrical schematic of the flasher unit of the present invention.
Figure 4B:
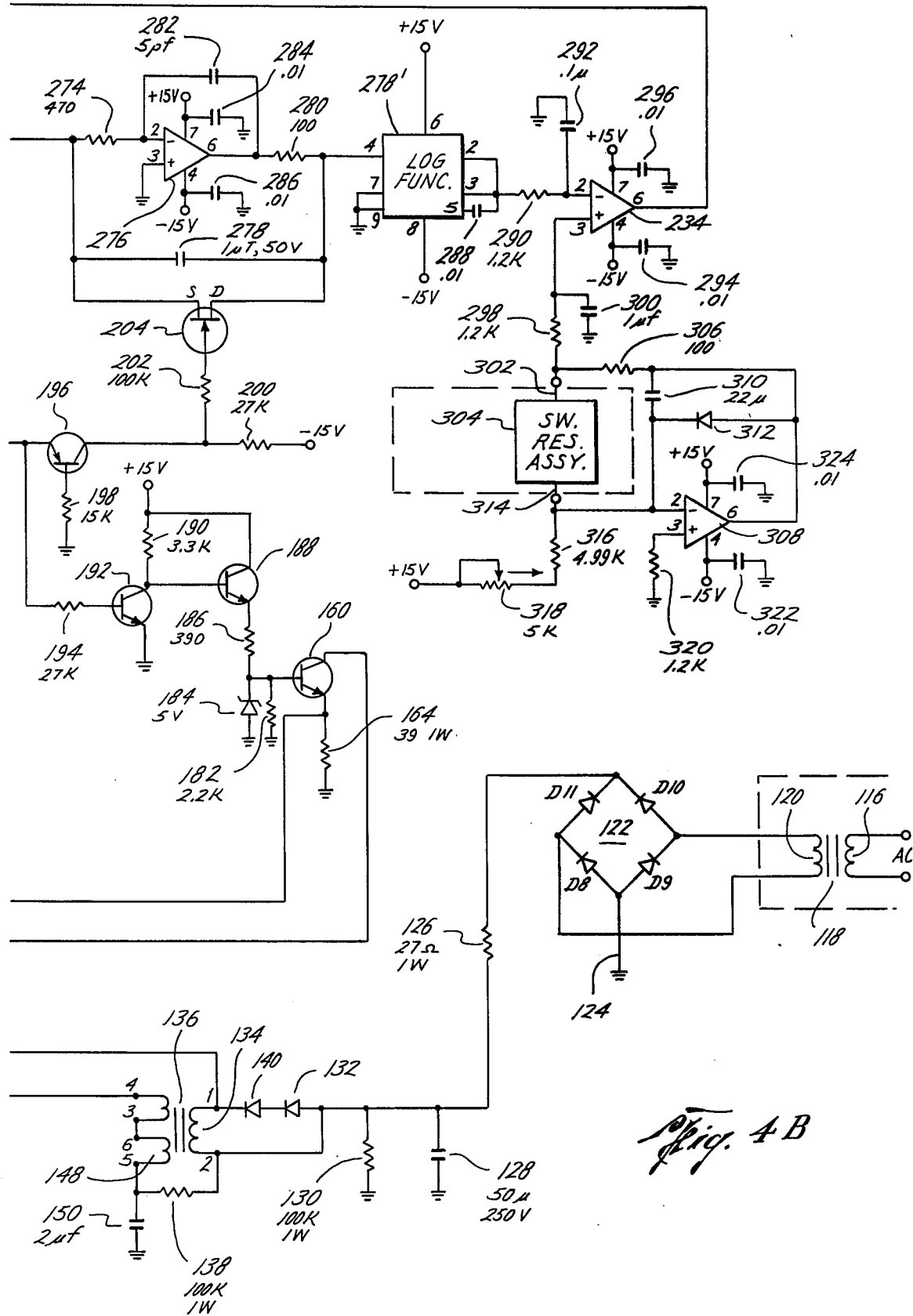

FIGS. 4A and 4B are an electrical schematic of the left and right side, respectively of the film flasher apparatus constructed according to the preferred embodiment of the present invention. FIG. 4 should be read by abutting the right hand side of FIG. 4A with the left hand side of FIG. 4B to produce FIG. 4.

(In FIG. 4) Alternating current at 115 volts, 60 cycles enters along power lines 100 from a standard AC source, not shown. The AC power passes through power switch 102 and fuse 104 (in FIG. 4A), which is a 1½ amp slo-blo fuse, to: the input of ±15 volt DC power supply 106 and the primary 108 of transformer 110 (in FIG. 4A), which is a triad R-30X, whose 6 V secondary 112 is connected to the heater circuit 113 of fluorescent tube 114 (in FIG. 4A). AC power line 100 is also connected to the primary windings 116 of transformer 118 (in FIG. 4B), which is also a Triad R-30X transformer. Transformer 118 has a 135 volt secondary 120, which feeds the input of bridge rectifier 122 (in FIG. 4B). One side of the output of bridge rectifier 122 is grounded through line 124.

(In FIG. 4) The positive output of bridge rectifier 122 passes through resistor 126 (in FIG. 4B), which is a 27 ohm 1%, 1 watt resistor, to one side of capacitor 128 (in FIG. 4B), which is a 50 Mfd 250 volt electrolytic capacitor, to one side of resistor 130 (in FIG. 4B), which is a 100,000 ohm 1 watt 1% metal film resistor, to one side of diode 132 (in FIG. 4B), which is a ECG125, to one side of primary 134 of transformer 136 (in FIG. 4B), which is a Triad F-138P, and to one side of resistor 138 (in FIG. 4B), which is a 100,000 ohm 1 watt 1% metal film resistor. The other side of capacitor 128 and resistor 130 are connected to ground. The other side of diode 132 is connected through diode 140 (in FIG. 4B), which is a ECG125, to the other side of primary 134; and through resistor 142 (in FIG. 4A), which is a 300 ohm 1% 5 watt resistor, to the anode 146 of fluorescent tube 114. The other side of resistor 138 is connected to secondary 148 of transformer 136 and through capacitor 150 (in FIG. 4B), which is a 2 Mfd 450 V capacitor, to ground.

(In FIG. 4) Transformer 136, which is a Triad F-138P, has two windings on the side attached to anode 146. Terminals 3 and 6 of transformer 136 are strapped together. Terminal 4 of transformer 136 is connected through diode 152, which is an ECG125, to one side of secondary 112 transformer 110 and also to one side of resistor 154 (in FIG. 4A), which is a 1 megohm 1 watt 1% resistor. The other side of resistor 154 is connected to anode 146 of fluorescent light 114.

(In FIG. 4) The positive 15V output of power supply 106 (in FIG. 4A) is connected through capacitor 156, which is a 6.8 Mfd 50V capacitor to ground. The negative 15V output of power supply 106 is connected through capacitor 158 (in FIG. 4A), which is a 6.8 Mfd 50V electrolytic capacitor, to ground.

(In FIG. 4) The side of diode 152 (in FIG. 4A) not connected to terminal 4 of transformer 136 is connected also to the collector of transistor 160, which is a DTS723. The emitter of transistor 160 (in FIG. 4B) is connected directly to one side of resistor 162, which is a 10,000 ohm 1% ¼ watt resistor, and through resistor 164, which is a 39 ohm 1 watt % resistor, to ground. The other side of resistor 162 (in FIG. 4A) is connected directly to test point 166 (in FIG. 4A); through diode 168 (in FIG. 4A), which is a 6V Zener diode, to ground; and through resistor 170 (in FIG. 4A), which is a 100,000 ohm 1%, ¼ watt resistor, to one side of capacitor 172 (in FIG. 4A) and to terminal 13 of integrated circuit 174 (in FIG. 4A). The other side of capacitor 172, which is a 0.1 Mfd 50V capacitor, is grounded.

(In FIG. 4) Integrated circuit 174 (in FIG. 4A) is a quad-two input Norgate functioning as a pair of flip-flops. Terminal 11 of integrated circuit 174 (in FIG. 4A) is connected to terminal 9 of integrated circuit 174. Terminal 12 of integrated circuit 174 is connected to terminal 10 of integrated circuit 174. Terminal 8 of integrated circuit 174 is connected to terminal 1 of integrated circuit 174. Terminal 5 of integrated circuit 174 is connected to terminal 3 of integrated circuit 174. Terminal 4 of integrated circuit 174 is connected to terminal 2 of integrated circuit 174.

(In FIG. 4) Terminal 11 of integrated circuit 174 is also connected through diode 176 (in FIG. 4A), which is a 1N914, to one side of diode 178 (in FIG. 4A), which is a 1N914, and to one side of resistor 180 (in FIG. 4A), which is a 10,000 ohm 1% ¼ watt resistor.

(In FIG. 4) The base of transistor 160 (in FIG. 4B) is connected through resistor 182, which is a 2,200 ohm 1% ¼ watt metal film resistor, and through diode 184, which is a 5V Zener diode, to ground. The base of transistor 160 is also connected through resistor 186 (in FIG. 4B), which is a 390 ohm 1% ¼ watt metal film resistor, to the emitter of transistor 188 (in FIG. 4B), which is a 2N2270. The collector of transistor 188 is connected to the ±15V output of power supply 106 (in FIG. 4B) and to one side of resistor 190 (in FIG. 4B), which is a 3,300 ohm 1% ¼ watt metal film resistor. The other side of resistor 190 is connected directly to the base of transistor 188 and to the collector of transistor 192 (in FIG. 4B), which may either be a 2N4401 or a 2N3904. The emitter of transistor 192 is grounded. The base of transistor 192 is connected through resistor 194 (in FIG. 4B), which is a 27,000 ohm 1% ¼ watt metal film resistor, to the emitter of transistor 196 (in FIG. 4B), which may be either a 2N3906 or a 2N4403. The base of transistor 196 is connected through resistor 198 (in FIG. 4B), which is a 15,000 ohm 1% ¼ watt metal film resistor, to ground. The collector of transistor 196 is connected through resistor 200 (in FIG. 4B), which is a 27,000 ohm 1% ¼ watt metal film resistor, to the −15V output of power supply 106; and through resistor 202 (in FIG. 4B), which is a 100,000 ohm 1% ¼ watt metal film resistor, to the gate of field effect transistor 204 (in FIG. 4B), which is an E112.

The emitter of transistor 196 is connected directly to the collector of transistor 206 (in FIG. 4A), which may be a 2N3904 or a 2N4401; and through resistor 208 (in FIG. 4A), which is a 1,000 ohm 1% ¼ watt metal film resistor, to the +15V output of power supply 106 (in FIG. 4A) and one side of resistor 210 (in FIG. 4A), which is a 1,000 ohm 1% ¼ watt metal film resistor. The emitter of transistor 206 is grounded. The base of transistor 206 is connected through resistor 212 (in FIG. 4A), which is a 4,700 ohm 1% ¼ watt metal film resistor, to terminal 4 of integrated circuit 174 (in FIG. 4A). The other side of resistor 210 is connected directly to the switch contact of pushbutton switch 214 (in FIG. 4A), which is a Switchcraft PL-2062-05 push to read switch. This switch contact is also connected through capacitor 216 (in FIG. 4A), which is a 0.01 Mfd 50V capacitor; through capacitor 218 (in FIG. 4A), which is a 22 Mfd 50V capacitor; and through diode 220 (in FIG. 4A), which is a 5V Zener diode, to ground. The switching contact of switch 214 is also connected directly to terminal 14 of integrated circuit 174 (in FIG. 4A).

(In FIG. 4) Terminal 1 of integrated circuit 174 is connected directly to one side of capacitor 222 (in FIG. 4A), which is a 0.01 Mfd 50V capacitor; to one side of resistor 224 (in FIG. 4A), which is a 10,000 ohm 1% ¼ watt metal film resistor; and to one side of resistor 226 (in FIG. 4A), which is a 1 megaohm 1% ¼ watt metal film resistor. The other side of resistor 224 (in FIG. 4A) is grounded. The other side of capacitor 222 (in FIG. 4A) and resistor 226 are connected together and further connected to the normally open contact of pushbutton switch 214 (in FIG. 4A). The normally closed contact of pushbutton switch 214 is connected to the other side of resistor 180 (in FIG. 4A).

(In FIG. 4) Terminal 6 of integrated circuit 174 (in FIG. 4A) is connected directly to one side of diode 178 (in FIG. 4A) and resistor 228, which is a 27,000 ohm 1% ¼ watt metal film resistor, and diode 230, which is a 1N 914. The other side of resistor 228 (in FIG. 4A) is grounded. The other side of diode 230 (in FIG. 4A) is connected through resistor 232 (in FIG. 4A), which is a 27,000 ohm 1% ¼ watt metal film resistor, to terminal 6 of operational amplifier 234 (in FIG. 4B), which is a 741 operational amplifier.

(In FIG. 4) Sensor 236 in FIG. 4A is connected to one side to ground and on the other side to one side of resistor 238 (in FIG. 4A), which is a 49,900 ohm 1% ¼ watt metal film resistor; to one side of resistor 240 (in FIG. 4A), which is 470 ohm 1% ¼ watt metal film resistor; to one side of resistor 242 (in FIG. 4A), which is a 75,000 ohm 1% ¼ watt metal film resistor; and to one side of capacitor 244 (in FIG. 4A), which is a 820 Pico Farraday 50V capacitor. The other side of resistor 238 (in FIG. 4A) is connected to the slider of potentiometer 246 (in FIG. 4A), which is a 5,000 ohm potentiometer.

(In FIG. 4) The high side of potentiometer 246 (in FIG. 4A) is connected through resistor 248 (in FIG. 4A), which is a 499,000 ohm 1% ¼ watt metal film resistor, to the +15V terminal of power supply 106 (in FIG. 4A). The low side of potentiometer 246 is connected through resistor 250 (in FIG. 4), which is a 499,000 ohm 1% ¼ watt metal film resistor, to the −15V output of power supply 106.

(In FIG. 4) The other side of resistor 240 (in FIG. 4A) is connected to terminal 2 of integrated circuit 252 (in FIG. 4A), which is an LF-156 operational amplifier. Terminal 2 of operational amplifier 252 (in FIG. 4A) is also connected to one side of capacitor 252 (in FIG. 4A), which is a 5 Pico Farraday 50V capacitor. The other side of capacitor 254 is connected to terminal 6 of integrated circuit 252 and to one side of resistor 256 (in FIG. 4A), which is a 100 ohm 1% ¼ watt metal film resistor. Terminal 3 of integrated circuit 252 is grounded. Terminal 4 of integrated circuit 252 is connected directly to the −15V output of power supply 106 and through capacitor 258 (in FIG. 4A), which is a 0.01 Mfd 50V capacitor, to ground. Terminal 7 of integrated circuit 252 is connected directly to the +15V output of power supply 106 and through capacitor 260 (in FIG. 4A), which is a 0.01 Mfd 50V capacitor, to ground.

(In FIG. 4) The other side of resistor 242 (in FIG. 4A) is connected to one side of potentiometer 262 (in FIG. 4A), which is a 50,000 ohm potentiometer. The slider of potentiometer 262 is connected to the other side of potentiometer 262, which is connected to the other side of resistor 256 and to the selector switch of first thumbwheel switch 264. The selector of thumbwheel switch 264 is also connected to the other side of capacitor 244 (in FIG. 4A).

(In FIG. 4) First thumbwheel switch 264 (in FIG. 4A) comprises a three-position thumbwheel switch capable of placing either resistor 266 (in FIG. 4A), which is a 4,990 ohm 1% ¼ watt metal film resistor, or resistor 268 (in FIG. 4A), which is a 49,900 ohm 1% ¼ watt metal film resistor, or resistor 270 (in FIG. 4A), which is a 49,900 ohm 1% ¼ watt metal film resistor, in series with its output 272 (in FIG. 4A). As shown, resistor 266 (in FIG. 4A) is selected and the resistance presented by first thumbwheel switch is 4,990 ohms. Output 272 of thumbwheel switch 264 (in FIG. 4A) is connected directly to the source terminal of field effects transistor 204 (in FIG. 4B); through resistor 274 (in FIG. 4B), which is a 470 ohm 1% ¼ watt metal film resistor, to terminal 2 of integrated circuit 276 (in FIG. 4B), which is an LF-156 operational amplifier; and through capacitor 278 (in FIG. 4B), which is a 0.1 Mfd 50V polycarbonate capacitor, to the drain terminal of field effects transistor 204.

(In FIG. 4) Drain terminal of field effects transistor 204 is also connected directly to terminal 4 of log function module 278 (in FIG. 4B), which is a Philbrick 4362, and through resistor 280 (in FIG. 4B), which is a 100 ohm 1% ¼ watt metal film resistor, to terminal 6 of integrated circuit 276 (in FIG. 4B) and to one side of capacitor 282, which is a 5 Picofarraday capacitor. The other side of capacitor 282 (in FIG. 4B) is connected to terminal 2 of integrated circuit 276 (in FIG. 4B).

(In FIG. 4) Terminal 3 of integrated circuit 276 is grounded. Terminal 7 of integrated circuit 276 is connected directly to the +15V output of power supply 106 (in FIG. 4A) and through capacitor 284 (in FIG. 4B), which is a 0.01 Mfd 50V capacitor, to ground. Terminal 4 of integrated circuit 276' is connected directly to the −15V output of power supply 106 (in FIG. 4A) and through capacitor 286 (in FIG. 4B), which is a 0.01 Mfd 50V capacitor, to ground.

(In FIG. 4) Terminal 6 of log function module 278 (in FIG. 4B) is connected directly to the +15V output of power supply 106. Terminal 3 of integrated circuit 278 (in FIG. 4B) is connected directly to terminal 2 of integrated circuit 278 and throgh capacitor 288 (in FIG. 4B), which is a 0.01 Mfd 50V capacitor, to terminal 5 of integrated circuit 278'. Terminal 8 of integrated circuit 278 is connected directly to the −15V output of power supply 106. Terminal 7 of log function module 278' is connected directly to terminal 9 of log function module 278 ' and to ground. Terminal 3 of log function module 278 is also connected through resistor 290 (in FIG. 4B), which is a 1,200 ohm 1% ¼ watt metal film resistor, to terminal 2 of integrated circuit 234 (in FIG. 4B) and through capacitor 292 (in FIG. 4B), which is a 0.01 Mfd 50V capacitor, to ground.

(In FIG. 4) Terminal 4 of operational amplifier 234 (in FIG. 4B) is connected directly to the −15V terminal of power supply 106 (in FIG. 4A) and through capacitor 294 (in FIG. 4B), which is a 0.01 Mfd 50V capacitor, to ground. Terminal 7 of operational amplifier 234 is connected directly to the +15V output of power supply 106 and through capacitor 296 (in FIG. 4B), which is a 0.01 Mfd 50V capacitor, to ground. Terminal 3 of integrated circuit 234 is connected to one side of resistor 298 (in FIG. 4B), which is a 1,200 ohm 1% ¼ watt metal film resistor, and through capacitor 300 (in FIG. 4B), which is a 1 Mfd 50V electrolytic capacitor, to ground. The other side of resistor 298 is connected to input 302 (in FIG. 4B) of switch resistor assembly 304 (in FIG. 4B), which is shown in FIG. 4B.

(In FIG. 4) Input 302 of switch 304 is also connected through resistor 306 (in FIG. 4B), which is a 100 ohm 1% ¼ watt metal film resistor, directly to terminal 6 of operational amplifier 308 (in FIG. 4B), which is a 741 operational amplifier, and through capacitor 310 (in FIG. 4B), which is a 22 Mfd 50V electrolytic capcitor, to one side of diode 312, which is a 1N914, and to terminal 2 of integrated circuit 308 (in FIG. 4B). The other side of diode 312 (in FIG. 4B) is connected to terminal 6 of integrated circuit 308.

(In FIG. 4) Terminal 2 of operational amplifier 308 (in FIG. 4B) is connected to output terminal 314 (in FIG. 4B) of switch assembly 304 (in FIG. 4B) and through resistor 316 (in FIG. 4B), which is a 4,990 ohm ⅛ watt 1% metal film resistor, to one side of potentiometer 318 (in FIG. 4B), which is a 5,000 ohm potentiometer. The other side of potentiometer 318 is connected to the slide wire of potentiometer 318 and directly to the +15V output of power supply 106 (in FIG. 4A). Terminal 3 of operational amplifier 308 is connected through resistor 320 (in FIG. 4B), which is a 1,200 ohm 1% metal film resistor, to ground. Terminal 4 of operational amplifier 308 is connected directly to the −15V output of power supply 106 and through capacitor 322 (in FIG. 4B), which is a 0.01 Mfd 50V capacitor, to ground. Terminal 7 of integrated circuit 308 (in FIG. 4B) is connected directy to the +15V output of power supply 106 and through capacitor 324 (in FIG. 4B), which is a 0.01 Mfd 50V capacitor, to ground.

Figure 4C:
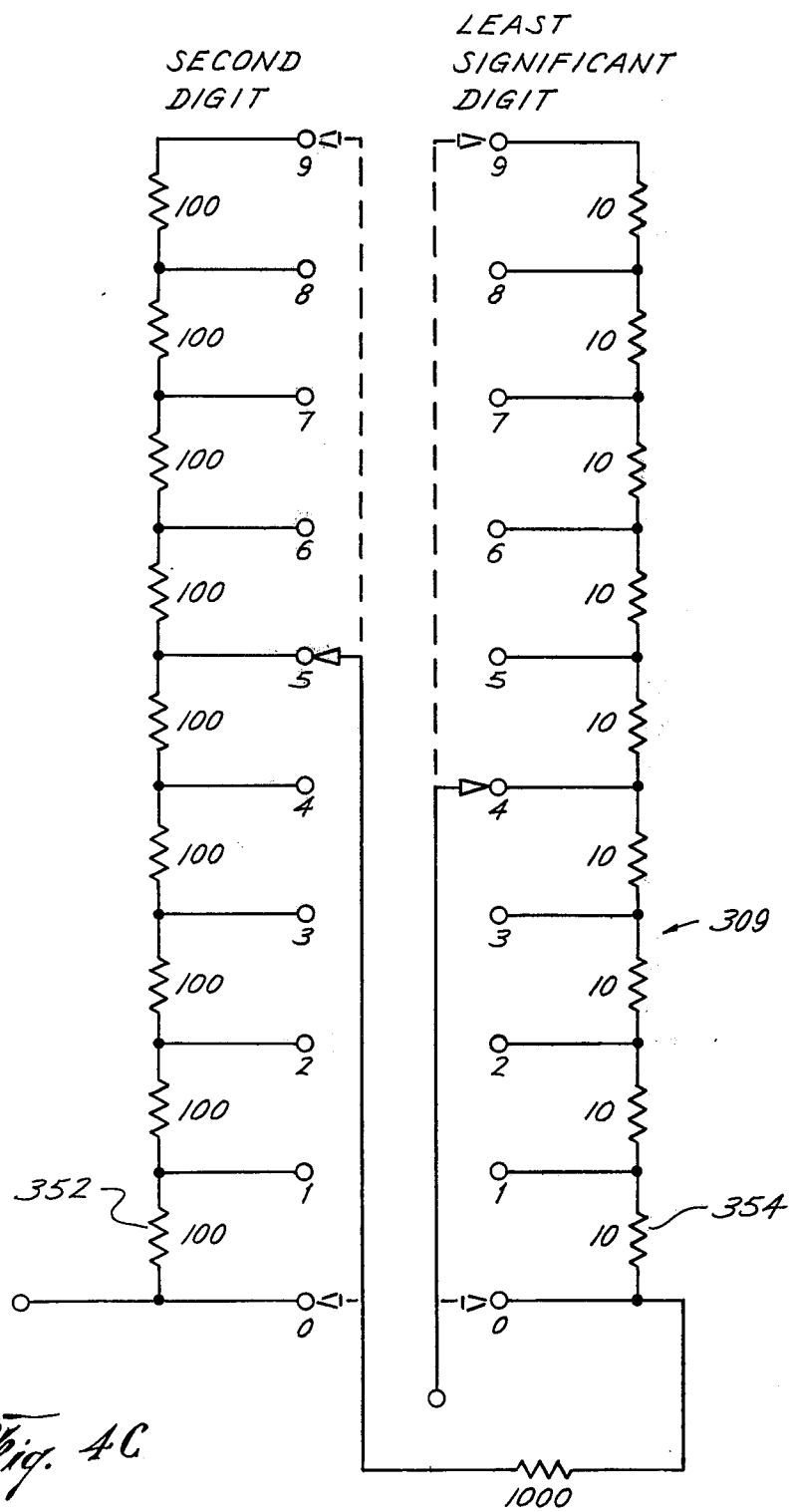

FIG. 4C illustrates the resistor ladder for the two thumbwheel switch assemblies shown diagrammatically as thumbwheel switch assembly 304 of FIG. 4. Thumbwheel switch assembly 304 is, for the second digit, a ladder of 10 resistors 352, each of which is a 100 ohm 1% ⅛ watt metal film resistor. The least significant digit ladder is composed of 9 resistors 354, each of which is a 10 ohm 1% ⅛ watt metal film resistor.

FUNCTIONAL DESCRIPTION OF FLASHER ELECTRONICS

Light sensor 236 is a current device that produces a current proportional to the illumination it senses. This current is an input to operational amplifier 252 (in FIG. 4A), which is a current to voltage amplifier. The output voltage from terminal 6 of integrated circuit 252 is fed through first thumbwheel switch 264 (in FIG. 4A), which is arranged so as to selectably attenuate the output voltage by a factor of 1, 10 or 100 to increase the dynamic range of the analog circuitry of the flasher, and perform the first digit selectin of the three-digit log relative exposure.

The output of first thumbwheel switch 264 is an input to integrated circuit 276, which is a resettable integrator. The output of integrated circuit 276 (in FIG. 4B) is the integral of the intensity sensed by sensor 236. This integral is the exposure. This output, i.e. the exposure sensed by sensor 236, is an input to log function module 278, which produces an output proportional to the log of the exposure sensed by sensor 236 (in FIG. 4A). The output of log function module 278, i.e. the log of the exposure sensed by sensor 236 is one input to comparator 234 (in FIG. 4B).

A reference current from power supply 106 (in FIG. 4A) is set by potentiometer 318 (in FIG. 4B) and resistor 316 (in FIG. 4B). Terminal 2 of integrated circuit 308 (in FIG. 4B) is a virtual ground. The purpose of this circuit is to maintain a constant current across the input 302 (in FIG. 4B) and output 314 (in FIG. 4B) of switch network 304. Changing the setting of switch network 304 (in FIG. 4B) supplies the last two digits of the three-digit Log Relative Exposure thumbwheel switch. As the resistance of switch network 304 changes, a precisely known voltage is applied to terminal 3, which is the non-inverting input of operational amplifier 234 (in FIG. 4B).

Setting potentiometer 318 (in FIG. 4B) allows the operator to program the flasher for different relative exposures. Changing the current passing through potentiometer 318 and resistor 316 (in FIG. 4B) changes the reference setting for exposure in the relative log exposure equations used by the device. The entire flasher is calabrated by adjusting potentiometer 318.

The output of comparator 234 (FIG. 4A) passes through resistor 232 (in FIG. 4A) and diode 230 (in FIG. 4A) to the normally closed contact of pushbutton switch 214 (in FIG. 4A).

Pushbutton switch 214 is the start button for the present apparatus. When the pushbutton switch is pressed, the center contact makes contact with the normally open contact connected to terminal 1 of integrated circuit 174 (in FIG. 4A), which functions as a dual flip-flop. When pushbutton switch 124 (in FIG. 4B) is depressed the flip-flop formed by terminals 1, 2, 3 and 4, 5 and 6 of integrated circuit 174 (in FIG. 4A) changes state. This causes transistor 206 (in FIG. 4A) to change state. When Q1 is turned on, field effect transistor 204 (in FIG. 4B) clears integrator 276 (in FIG. 4B). Simultaneously transistors 192 and 188 (in FIG. 4B) change the state of transistor 160 (in FIG. 4B), which is a constant current source driver of lamp 114 (in FIG. 4A).

When power switch 102 (in FIG. 4A) is initially turned on, integrated circuit 174 (in FIG. 4A) is in the state where transistor 206 (in FIG. 4A) is turned off. To make an exposure, pushbutton switch 214 (in FIG. 4A) is depressed and field effect transistor 206 turned on. This causes transistor 204 (in FIG. 4B) to clear integrator 276 (in FIG. 4B) and turns transistor 160 on.

When transistor 160 (in FIG. 4B) is turned on a voltage spike is applied by capacitor 150 (in FIG. 4B) to the strapped windings 148 (in FIG. 4B) of transformer 136 (in FIG. 4B). This places a voltage spike across anode 146 (in FIG. 4A) of fluorescent tube 114 (in FIG. 4A). This voltage spike, in addition to the voltage supplied by transformer 118 (in FIG. 4B) through bridge network 122 (in FIG. 4B), causes the fluorescent tube to light. Once the fluorescent tube is lit, the current passing through it is limited by transistor 160 (in FIG. 4B). This entire "turn on" operation takes only a few microseconds.

If, through some mischance such as the failure of a filament, fluorescent tube 114 (in FIG. 4A) does not light, then, no current will be flowing through transistor 160 and the second flip-flop of integrated circuit 172 (in FIG. 4A) will produce a logic "1" at its output terminal 11 (in FIG. 4A). This logic "1" at output 11 will be fed to terminal 1 of integrated circuit 174 (in FIG. 4A), which will trigger the control flip-flop and shut down the circuit.

PHYSICAL DESCRIPTION OF THE FLASHER APPARATUS

FIG. 5 is a partially cut-away top view of the flasher apparatus taught by the preferred embodiment of the present invention.

Housing 500 contains pass-thrus for power cord 100, switch 102, and fuse 104.

The electronics discussed above in connection with FIG. 4 are mounted on printed circuit board 502, which is held apart from the top cover of housing 500, not shown, by one inch threaded spacers 504.

Switch 214 and thumbwheel switches 264 and 304 are mounted above printed circuit board 502.

Power supply 106 is connected in any convenient manner to power supply mounting bracket 504, which is in turn attached by screws or other convenient fastening means to the underside of the top of housing 500. Transformer 110 is similarly affixed to the underside of housing 500.

Radiant cavity 506 is attached to the underside of the top cover of housing 500 by a plurality of threaded spacers 508. Fluorescent tube 114 passes through radiant cavity 516 near its end opposite power supply 106. A ½" clear acrylic rod 510 extends upward from the interior of the radiant cavity approximately over fluorescent tube 114.

An illuminating port 512, which is approximately 2"×2" is provided in the portion of integrating cavity 506 near power supply mounting bracket 504. This illuminating port is covered with a 2"×2" green glass filter 514. Sensor 236 is affixed to filter 514 so its light sensing side is directed into the interior of integrating cavity 506.

A 22×50 milimeter one-ounce cover glass 516 covers a portion of filter 514. A first light barrel asembly 518, comprising a 2.000 light barrel aperture, and a focus aperture mounted in a 5 inch diameter cylinder is attached to the cover glass and extends upward from the drawing. A second light barrel apparatus 520 comprising a 0.1414 light barrel aperture, and a focus aperture in a second 0.5 inch diameter cylinder also is affixed to the cover glass proximate light barrel assembly 518. Light barrel assembly 520 also extends upward from the plane of the drawing.

Case 500 may be made of any suitable material, such as aluminum or steel. Integrating cavity 506 may be made of a suitable material such as plastic which has been coated on its interior with a diffuse reflective coating, such as dull white paint.

FIG. 6 shows a view of the flasher apparatus taught by the preferred embodiment of the present invention taken along lines 6—6 of FIG. 5. Here like numbers indicate like structures.

Here case 500 is shown standing on legs 600, which prevent furniture from being scratched. The reason for this illustration is to show the construction of the integrating cavity and the position of the film entry slot in the apparatus. Case 500 is provided with a lower cover 602 and an upper cover 604. These covers are closely fitted together at the end of the device containing switches 214 and 264. However, the covers are machined so as to provide a entry slot capable of receiving radiographic film 606 at the end of the device containing radiant cavity 506.

Over a portion of and affixed to top cover 604 is upper radiant cavity 608. Upper radiant cavity 608 covers the portion of slot 606 containing the upper ends of attenuating apertures 518 and 520. Generally the upper radiant cavity 608 and top covers 604 and 602 will be made of aluminum. A red plastic lens cap 610 is provided in top integrating cavity 608 proximately over the end of lucite rod 510. The purpose of this red cap is to give a visual indication to the operator that the unit is flashing. The function of the entire cavity is to provide a uniform light field for exposing the patient I.D. information simultaneously with the reference dot exposure while maintaining the same exposure relationship for various settings of Log Relative Exposure.

FIG. 7 is a view taken along line 7—7 of FIG. 5 showing another cross section of the flasher constructed according to the preferred embodiment of the present invention.

The purpose of including this view is to show details of the arrangement of the radiant cavity and optical system of the flasher. Radiant cavity 506 is spaced a fair distance below top cover 602 of case 500 by spacers 508.

Lucite rod 510 can be seen extending from the interior of radiant cavity 506 into upper radiant cavity 608. The function of this lucite bar is to pass light into the upper radiant cavity so that an observer looking at red plastic indicator 610 can tell the system is functioning.

Light barrel 518 is shown cut-away to reveal its internal details. The end of light barrel 518 proximate the interior of radiant cavity 506 is fitted with an aperture plate 700, the aperture of which depends on the degree of attenuation desired. The smaller the aperture the greater the attenuation. The present invention uses one aperture preferably having a diameter of 0.1414 inches and one aperture having a diameter of 0.2000 inches. Slightly less than half way up light barrel 518 a light barrel baffle 702 is provided to prevent internal reflection. The interior of light barrel 518 is threaded and anodized dull black. The threading and anodizing reduces internal reflection and provides that the light impinging on the film slot 606 and thus passing into upper radiant cavity 608 from the upper end 704 of light barrel 518 will be even and specular, i.e. its diffuse component will be minimized.

Aperture 700 is so arranged that both the apertures from each light tube see an overlapping area within radiant cavity 506. The purpose of filter 514 is to produce a light whose frequency characteristics are compatible with the sensitivity of the radiographic film being flashed.

It has been experimentally determined that clinical x-ray film need only be flashed from one side because the difference in density resulting in exposure from either side of the film is less than 0.03. The same unfortunately, is not true of some industrial radiographic film. To use the present device with at least some types of industrial radiographic film it is necessary to provide a second flashing source to expose the upper emulsion.

Figures 8, 8A, 10:
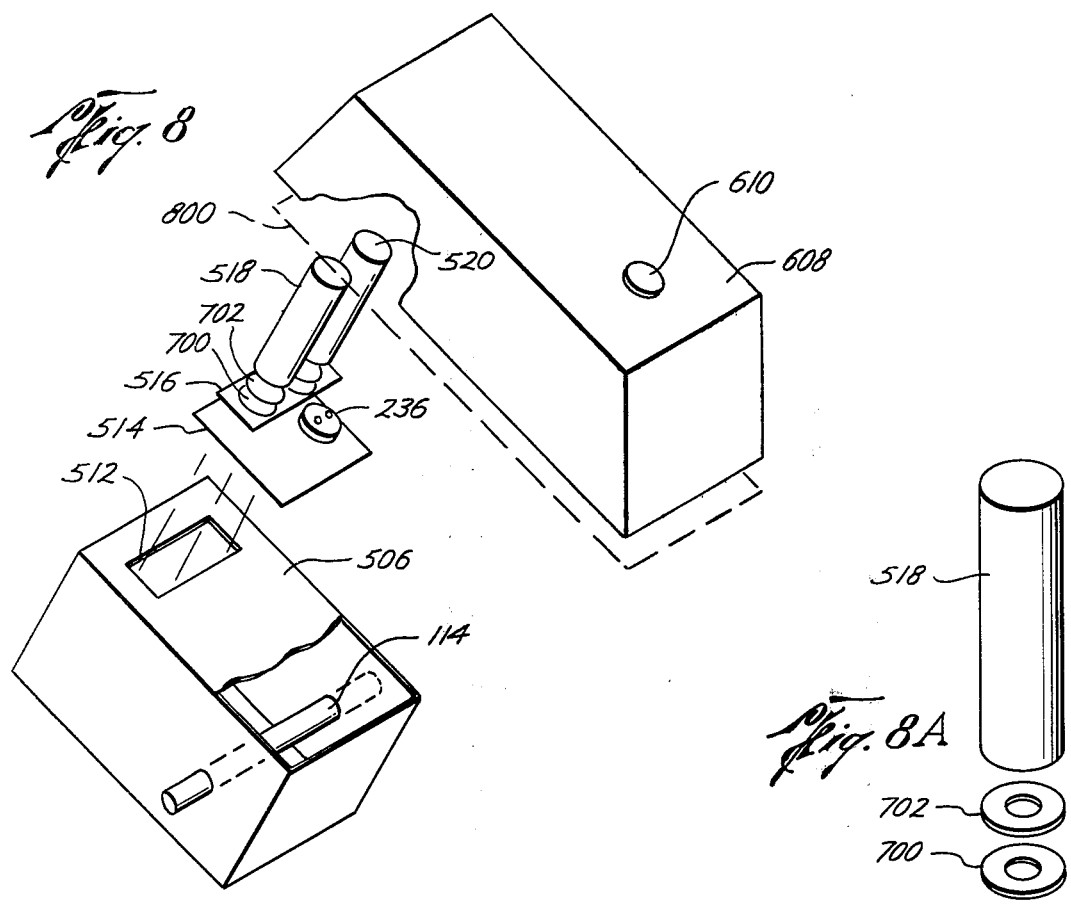
FIG. 8 is an exploded isometric detailed view of the optical path of the flasher apparatus taught by the preferred embodiment of the present invention.
FIG. 10 is the binary truth table of the programmable read-only memories of the electrical luminescent flasher.

FIG. 8 shows an exploded isometric view of the optical system of the flasher shown in FIGS. 5, 6 and 7.

Radiant cavity 506 is shown cut-away so tube 114 can be seen. The interior of the radiant cavity is coated with a diffusion coating. The ends of tube 114 will normally be opaqued. Opening 512 and filter 514 together with cover glass 516 are shown.

Film 800 is shown in the position it would occupy when it is being flashed, i.e. in slot 606 proximate the end of light attenuating tubes 518 and 520.

In a conventional densitometer, the geometric placement of the film with respect to the light source is extremely critical. This is because the absorption geometry of the film with respect to a mixed diffuse-specular light source can appear in changes density measurements. These errors are significant and necessitate the extremely complex optical system and precise film holding mechanisms found in the prior art. The present invention is much less dependent on the geometry of the film. A correct reading can be had even with a fairly large slot 606. This makes the system easy to use and very simple.

FIG. 8A shows an exploded view of one light tube constructed according to the preferred embodiment of the present invention.

Here light tube 518, which is threaded and anodized on its interior surface to prevent internal reflections, is fitted medially with a light barrel baffle 702 and terminally at its integrated cavity end with an aperture plate 700. The size of the opening in aperture plate 700 determines the degree of attenuation accomplished by the tube and also determines the location of baffle 702.

Focus aperture 702 will move toward the end of the tube near aperture 700 as the opening in aperture ring 700 is enlarged.

OPERATION OF THE FLASHER

To operate the flasher of the present invention, thumbwheel switches 264 and 304 are set to a value chosen so as to yield exposure on the linear portion of the D-log E curve of the film being used. A portion of the exposed film is then inserted into slot 606 so it lies above the upper end 704 of light tubes 518 and 520. Pushbutton switch 214 is then depressed and the flasher exposes the film. As was discussed above analog sensor 236 measures the exposure of the film and shuts the flasher off after a preset amount of exposure. The film then is removed from the machine and processed.

ELECTRICAL DESCRIPTION OF ELECTROLUMINESCENT DIGITAL FLASHER

FIG. 9 shows an alternative embodiment of the flasher taught by the present invention. This embodiment is digital.

FIG. 9 is a block diagram which is directed to those skilled in the art of digital electronics, thus individual innerconnections will not be described.

A two megaHertz crystal oscillator 900 drives scaling divider 902 which is connected in parallel with decimel select switch 904.

The output of scaling divider 902 is one input to a repeating divider reset 904.

The two megaHertz crystal oscillator also drives divide by two circuit 906 whose output drives second divide by two counter 908, whose output drives third divide by two counter 910. The high and low outputs of counter 910 are connected through switching network 912 to power switching network 914, which comprises two 2N3904 transistors driving two 2N2270 transistors to drive a light emitting panel 930' through transformer 916.

The output of scaling divider 902 is an input to divide by ten scaler 418. The output of scaling counter 918 is an input to divide by ten counter 920. Either the input from scaling divider 902, the output from scaling counter 918, or the output from scaling counter 920 may be selected by switch 922 as input to programed counters 924. Counter complex 924 comprises four 4029 counters in series.

The preset inputs of program counters 924 are connected to two PROMs (programmable read only memories) 926. These PROMS are programmed according to the truth table shown in FIG. 10. These PROMS may be DM-8577s. PROMS are connected together and to a BCD encoded thumb switch 928 which is driven by a 15 V power supply, not shown. The output of counter complex 924 is the reset input to flip-flop 930.

The start input of flip-flop 930 is connected to a power source which keeps it high except when "push to start" switch 932 is closed and the power source is grounded through RC network 934.

FUNCTION OF DIGITAL FLASHER

When pushbutton switch 932 is closed and start output of flip-flop 930 is grounded, the flip-flop resets all the counters in this embodiment of the invention and actuates switching network 912 which turns on the light emitting panels through transistor switches 914 and transformer 916. When repeating divider reset 904 triggers the count from the two megaHertz crystal, oscillator 900 begins to count into program counter 924. The speed at which the count accumulates in counter 924 depends on the setting of the decimal select switch 904 connected in parallel to scaling divider 902, and on the setting of switch 922 to decade dividers 918 and 920. The setting on thumbwheel switch 928, which is a BCD switch selecting the appropriate output of PROMs 926, determines the preset count of the counter. Once the count in programmed counter 924 reaches the present count set by PROMS 926 and 928, then program counter 924 inputs a carry-out pulse to the reset input of flip-flop 930. This changes the state of the flip-flop and turns off switch network 912, thus extinguishing light emitting panel 930.

FIG. 10 is a truth table showing the address code, equivalent number and binary number for PROMs 926.

It should be noted that the exposure from panel 930 is a log value, i.e, given that the exposure is equal to $10_{xyz}$, then decimel select switch 904 selects "z" of "xyz", BCD memory switch 928 selects "y" of "xyz" and the most significant digit "x" of "xyz" is selected by decade scaling switch 922.

ELECTRICAL DESCRIPTION OF READER APPARATUS

Figure 11A:
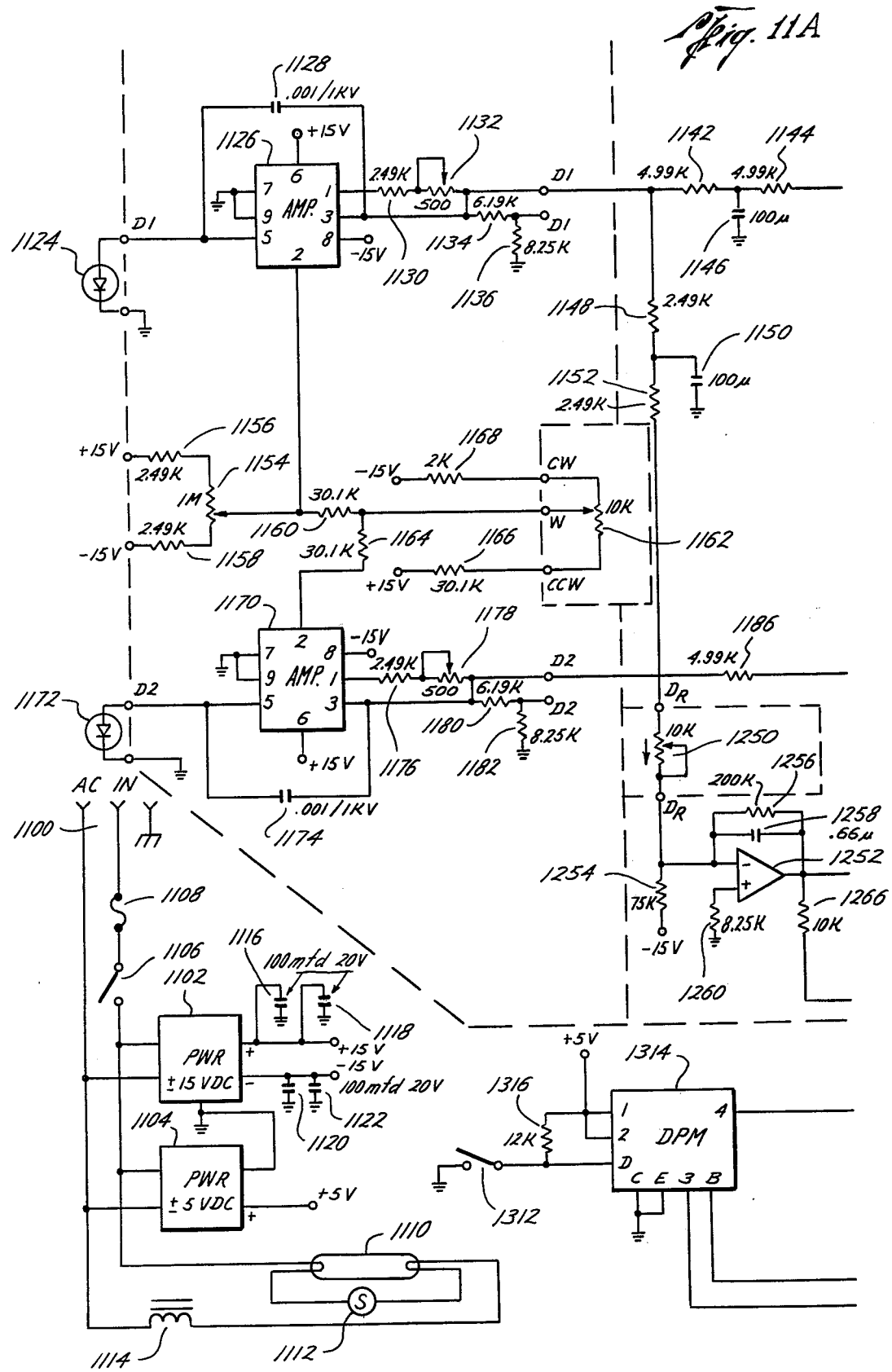
FIGS. 11A and 11B are an electrical schematic of the film reader taught by the preferred embodiment of the present invention.
Figure 11B:
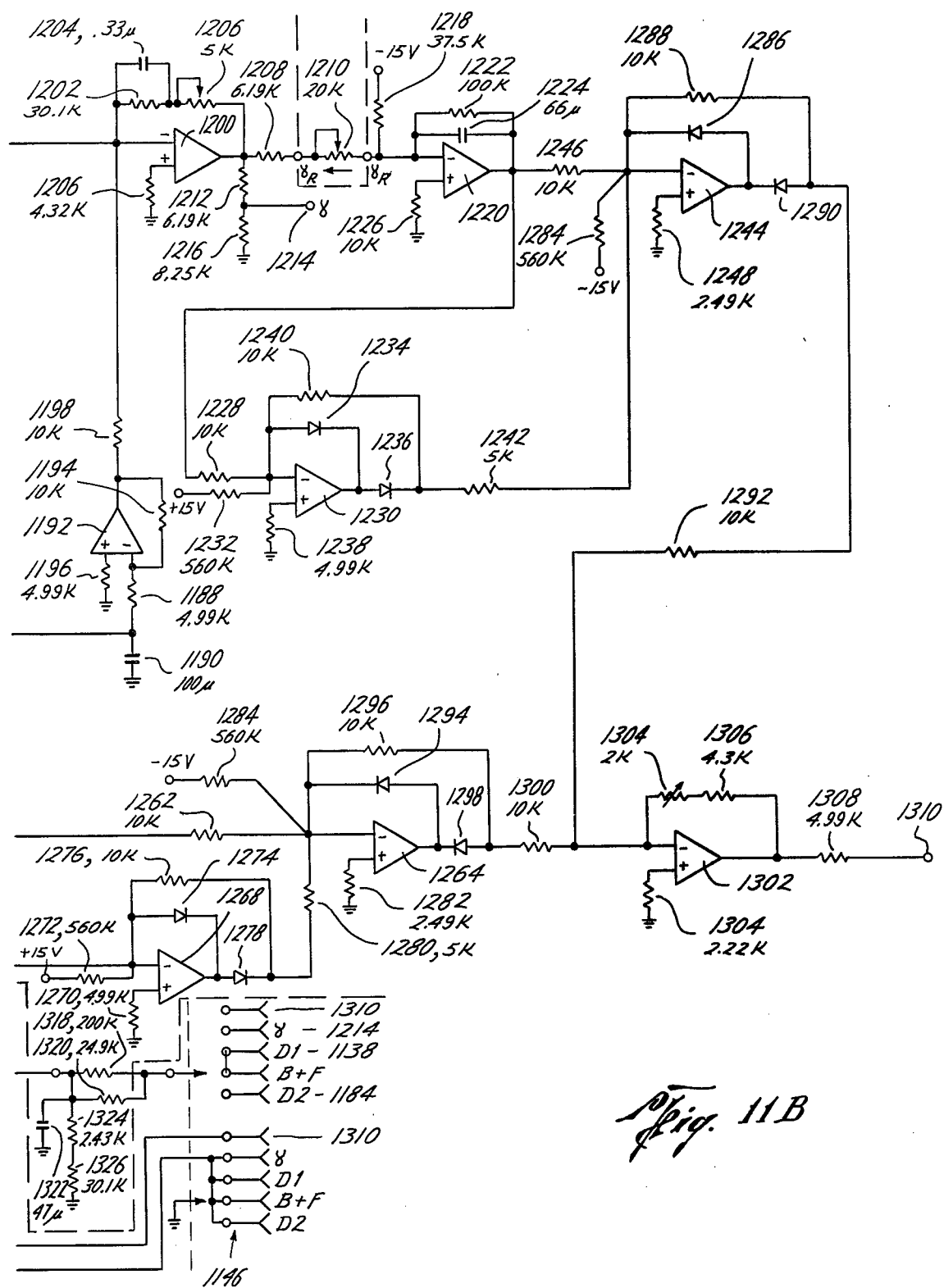

FIGS. 11A and 11B are an electrical schematic diagram of the reader apparatus taught by the preferred embodiment of the present invention.

Power line 1100 is connected to a source of 115 volt AC 60 cycle power, not shown. ±15 V power supply 1102 and ±5 V DC power supply 1104 are connected to the 60 cycle input line through power switch 1106 and ¼ amp slo-blo fuse 1108, which are connected in series. Fluorescent light 1110 is connected in parallel across AC line 1100. Starter 1112 is also connected in parallel across flourescent tube 1110 and ballast transformer 1114 is connected in series with one side of fluorescent tube 1110.

The positive output of power supply 1102 is connected to ground through capacitors 1116 and 1118, each of which is a 100 Mfd 20 V electrolytic capacitor. Similarly, −15 V output of power supply 1102 is connected to ground through filter capacitors 1120 and 1122, each of which is a 100 Mfd 20 V electrolytic capacitor.

First sensor 1124 is connected between ground and terminal 5 of log amplifier 1126, which may be a Philbrick 4362. Terminal 5 of log amplifier 1126 is connected through capacitor 1128, which is a 0.001 Mfd 1,000 V disc capacitor, to terminal 3 of integrated circuit 1126. Terminals 7 and 9 of integrated circuit 1126 are grounded. Terminal 6 of integrated circuit 1126 is connected to the +15 V output of power supply 1102. Terminal 8 of integrated circuit 1126 is connected to the −15 V output of power supply 1102. Terminal 1 of integrated circuit 1126 is connected through resistor 1130, which is a 2,490 ohm 1% ¼ watt metal film resistor, to the slide wire in one side of potentiometer 1132, which is a 500 ohm potentiometer. The other side of potentiometer 1132 is connected directly to terminal 3 of integrated circuit 1126 and through resistor 1134, which is a 6,190 ohm 1% ¼ watt metal film resistor, to one side of resistor 1136, which is a 8,250 ohm 1% ¼ watt metal film resistor, and directly to density one input 1138 of the top bank of selector switch 1146.

The output side of potentiometer 1132 is also connected through resistor 1142, which is a 4,990 ohm 1% ¼ watt metal film resistor, to one side of resistor 1144, which is a 4,990 ohm 1% ¼ watt metal film resistor, and to one side of capacitor 1145, which is a 100 Mfd 20 V capacitor; and through resistor 1148, which is a 249,000 ohm 1% ¼ watt metal film resistor, to one side of capacitor 1150 and one side of resistor 1152. Capacitor 1150 is a 100 Mfd 20 V electrolytic capacitor and resistor 1152 is a 2,490 ohm 1% ¼ watt metal film resistor. The other side of capacitors 1146 and 1150 are connected to ground.

Terminal 2 of integrated circuit 1126 is connected directly to the slider wire of potentiometer 1154, which is a 1 meg ohm potentiometer. One side of potentiometer 1154 is connected through resistor 1156, which is a 249,000 ohm 1% ¼ watt metal film resistor, to the +15 V output of power supply 1102. The other side of potentiometer 1154 is connected through resistor 1158 to the −15 V output of power supply 1102. Terminal 2 of integrated circuit 1126 is also connected through resistor 1160, which is a 30,100 ohm 1% ¼ watt metal film resistor, to the slider of potentiometer 1162 and to one side of resistor 1164, which is a 30,100 ohm 1% ¼ watt metal film resistor. Potentiometer 1162 is a 10,000 ohm potentiometer. One side of potentiometer 1162 is connected through resistor 1166, which is a 30,100 ohm 1% ¼ watt metal film resistor, to the +15 V output of power supply 1102. The other side of potentiometer 1162 is connected through resistor 1168, which is a 2,000 ohm 1% ¼ watt metal film resistor, to the −15 V output of power supply 1102.

The other side of resistor 1164 is connected to terminal 2 of integrated circuit 1170, which is a Philbrick 4362 log ratio amplifier. Terminals 7 and 9 of integrated circuit 1170 are grounded. Terminal 5 of integrated circuit 1170 is connected to one side of second sensor 1172. The other side of sensor 1172 is grounded. Terminal 5 of integrated circuit 1170 is connected through capacitor 1174, which is a 0.001 Mfd 1,000 V disk capacitor, to terminal 3 of integrated circuit 1170. Terminal 6 of integrated circuit 1170 is connected to the +15 V output of power supply 1102. Terminal 8 of integrated circuit 1170 is connected to the −15 V output of power supply 1102. Terminal 1 of integrated circuit 1170 is connected through resistor 1176, which is a 2,490 ohm 1% ¼ watt metal film resistor, to the slider in one side of potentiometer 1178, which is a 500 ohm potentiometer. The output side of potentiometer 1178 is connected through resistor 1180, which is a 6,190 ohm 1% ¼ watt metal film resistor, to one side of resistor 1182, which is a 8,250 ohm 1% ¼ watt metal film resistor, and to second density terminal 1184 of selector switch 1146.

The output side of potentiometer 1178 is also connected through resistor 1186, which is a 4,990 ohm 1% ¼ watt metal film resistor, to one side of resistor 1188, which is a 4,990 ohm 1% ¼ watt metal film resistor, and to one side of capacitor 1190, which is a 100 Mfd 20 V electrolytic capacitor. The other side of capacitor 1190 is grounded. The other side of resistor 1188 is connected directly to the inverting input of operational amplifier 1192, which is an AD741KH, and indirectly through resistor 1194, which is a 10,000 ohm 1% ¼ watt metal film resistor, to the output of operational amplifier 1192. The non-inverting input of operational amplifier 1192 is grounded through resistor 1196, which is a 4,990 ohm 1% ¼ watt metal film resistor. The output of operational amplifier 1192 is connected through resistor 1198, which is a 10,000 ohm 1% ¼ watt metal film resistor, to the inverting input of operational amplifier 1200, which is an AD741KH; indirectly through resistor 1144 to capacitor 1146 and to one side of resistor 1202, which is a 30,100 ohm 1% ¼ watt metal film resistor, and to one side of capacitor 1204, which is a 0.33 Mfd 20 V capacitor. The non-inverting input of operational amplifier 1200 is grounded through resistor 1206, which is a 4,320 ohm 1% ¼ watt metal film resistor. The other side of resistor 1202 and capacitor 1204 are connected together and to the slide wire of potentiometer 1206, which is a 5,000 ohm potentiometer. The other side of potentiometer 1206 is connected to the output of operational amplifier 1200 directly; through resistor 1208, which is a 6,190 ohm 1% ¼ watt metal film resistor, to the slide wire in one side of potentiometer 1210, which is a 20,000 ohm potentiometer. The output of operational amplifier 1200 is also connected through resistor 1212, which is a 6,190 ohm 1% ¼ watt metal film resistor, to gamma input 1214 of selector switch 1146 and to one side of resistor 1216, which is an 8,250 ohm 1% ¼ watt metal film resistor. The other side of resistor 1216 is grounded.

The other side of potentiometer 1210 is connected to resistor 1218, which is a 37,500 ohm 1% ¼ watt metal film resistor, to the −15 V output of power supply 1102. The output of potentiometer 1210 is also connected directly to the inverting input of operational amplifier 1220, which is a AD741KH and indirectly through resistor 1222, which is a 100,000 ohm 1% ¼ watt metal film resistor, and capacitor 1224, which is a 0.66 Mfd 50 V capacitor, to the output of operational amplifier 1220. The non-inverting input of operational amplifier 1220 is connected through resistor 1226, which is a 10,000 ohm 1% ¼ watt metal film resistor, to ground. The output of operational amplifier 1220 is connected through resistor 1228 directly to the inverting input of operational amplifier 1230, which is an AD741KH. The inverting input of operational amplifier 1230 is connected through resistor 1232, which is a 560,000 ohm 1% ¼ watt metal film resistor, to the +15 V output of power supply 1102. The inverting input of operational amplifier 1230 is also connected through diode 1234, which is a 1N914, to the output of operational amplifier 1234 and to one side of diode 1236, which is also a 1N914. The non-inverting input of operational amplifier 1230 is connected through resistor 1238, which is a 4,990 ohm 1% ¼ watt metal film resistor, to ground. The other side of diode 1236 is connected through resistor 1240, which is a 10,000 ohm 1% ¼ watt metal film resistor, to the inverting input of operational amplifier 1230 and through resistor 1242, which is a 5,000 ohm 1% ¼ watt metal film resistor, to the inverting input of operational amplifier 1244, which is a AD741KH.

The output of operational amplifier 1220 is connected through resistor 1246, which is a 10,000 ohm 1% ¼ watt metal film resistor, to the inverting input of operational amplifier 1244. The non-inverting input of operational amplifier 1244 is connected through resistor 1248, which is a 2,490 ohm 1% ¼ watt metal resistor, to ground.

Referring once again to resistor 1152, the side of resistor 1150 not connected to capacitor 1250 is connected to one side of potentiometer 1250, which is a 10,000 ohm screwdriver type adjust panel potentiometer. The other side and slide wire of potentiometer 1250 is connected directly to the inverting input of operational amplifier 1252, which is a AD741KH, and indirectly through resistor 1254 to the −15 V output of power supply 1202. The inverting input of operational amplifier 1252 is connected through resistor 1256, which is a 200,000 ohm 1% ¼ watt metal film resistor, and capacitor 1258, which is a 0.66 Mfd 50 V capacitor, to the output of operational amplifier 1252. The non-inverting input of operational amplifier 1252 is connected through resistor 1260, which is a 8,250 ohm 1% ¼ watt metal film resistor, to ground. The output of integrated circuit 1252 is connected through resistor 1262, which is a 10,000 ohm 1% ¼ watt metal film resistor, to the inverting input of operational amplifier 1264, which is an AD741KH. The output of operational amplifier 1252 is also connected through resistor 1266, which is a 10,000 ohm 1% ¼ watt metal film resistor, to the inverting input of operational amplifier 1268, which is an AD741KH. The non-inverting input of operational amplifier 1268 is connected through resistor 1270, which is a 4,990 ohm 1% ¼ watt metal film resistor, to ground. The inverting input of integrated circuit 1268 is connected through resistor 1272, which is a 560,000 ohm 1% ¼ watt metal film resistor, to the +15 V output of power supply 1102. The inverting input of operational amplifier 1268 is connected through diode 1274, which is a 1N914, to one side of diode 1278, which is also a 1N914, and to the output of operational amplifier 1268. The inverting input of operational amplifier 1268 is connected through resistor 1276, which is a 10,000 ohm 1% ¼ watt metal film resistor, to the other side of diode 1278 and to one side of resistor 1280, which is a 5,000 ohm 1% ¼ watt metal film resistor. The other side of resistor 1280 is connected to the inverting input of operational amplifier 1264.

The non-inverting input of operational amplifier 1264 is grounded through resistor 1282, which is a 2,490 ohm 1% ¼ watt metal film resistor. The inverting input of operational amplifier 1264 is connected through resistor 1284, which is a 560,000 ohm 1% ¼ watt metal film resistor, to the −15 V output of power supply 1102.

Referring once again to operational amplifier 1244, the inverting input of operational amplifier 1244 is connected through resistor 1284, which is a 560,000 ohm 1% ¼ watt metal film resistor, to the −15 V output of power supply 1102. The non-inverting input of operational amplifier 1244 is also connected through diode 1268, which is a 1N914, to one side of diode 1290, which is a 1N914, and to the output of operational amplifier 1244. The other side of diode 1290 is connected through resistor 1288, which is a 10,000 ohm 1% ¼ watt metal film resistor, to the inverting input of operational amplifier 1244 and to one side of resistor 1292, which is a 10,000 ohm 1% ¼ watt metal film resistor.

Referring again to operational amplifier 1264, the inverting input of operational amplifier 1264 is connected through diode 1294, which is a 1N914, to one side of diode 1298, which is a 1N914, and to the output of integrated circuit 1264. The other side of diode 1298 is connected through resistor 1296, which is a 10,000 ohm 1% ¼ watt metal film resistor, to the inverting input of integrated circuit 1264. The side of diode 1298 not connected to operational amplifier 1264 is connected through resistor 1300, which is a 10,000 ohm 1% ¼ watt metal film resistor, to the inverting input of operational amplifier 1302, which is an AD741KH.

The other side of resistor 1292 is also connected to the inverting input of operational amplifier 1302. The non-inverting input of operational amplifier 1302 is grounded through resistor 1304, which is a 2,200 ohm 1% ¼ watt metal film resistor. The inverting output of operational amplifier 1302 is connected through potentiometer 1304 in series with resistor 1306 to the output of operational amplifier 1302. Potentiometer 1304 is a 2,000 ohm potentiometer and resistor 1306 is a 4,300 ohm 1% ¼ watt metal film resistor. The output of operational amplifier 1302 is connected through resistor 1308, which is a 4,990 ohm 1% ¼ watt metal film resistor, to the PQF (processor quality factor) input 1310 of selector switch 1146.

One side of momentary contact pushbutton single-pulse switch 1312 is grounded. The other side of switch 1312 is connected directly to the D-terminal input of digital panel meter 1314 and indirectly, through resistor 1316, which is a 12,000 ohm 1% ¼ watt metal film resistor, to terminals 1 and 2 of digital panel meter 1314 and to the +5 V output of power supply 1102. Terminal 3 of digital panel meter 1314 is connected to ground through selector switch 1146. Terminal B, the decimal point terminal, of digital panel meter 1314 is connected to PQF output 1310 from operational amplifier 1302. Terminal 4, which is the meter terminal, of digital panel meter 1314 is connected through resistor 1318, which is a 200,000 ohm 1% ¼ watt metal film resistor, to the moving contact of selector switch 1146. Terminal 4 is also connected through resistor 1320, which is a 24,900 ohm 1% ¼ watt metal film resistor, to the movable contact on the selector switch. Terminal 4 of digital panel meter 1314 is also connected through capacitor 1322, which is a 47 Mfg 50 V DC capacitor, to ground and through resistor 1324, which is a 2,430 ohm 1% ¼ watt metal film resistor, to one side of resistor 1326, which is a 30,100 ohm 1% ¼ watt metal film resistor. The other side of resistor 1326 is connected to ground.

Terminal 1138 and the base-plug-fog terminal of selector switch 1146 are connected together.

FUNCTIONAL DESCRIPTION OF THE READER

Functionally, the output of sensor 1124 is a variable current that is converted to a log voltage by log amplifier 1126. The illumination sensed by sensor 1172 results in its producing a variable current, which is a function of the sensed illumination. This current is converted to a log voltage by log amplifier 1170. The output of log amplifier 1170 is inverted by operational amplifier 1192 and the output of operational amplifier 1192 is an input to the inverting input of operational amplifier 1200. The voltage output of log amplifier 1126 responsive to sensor 1124 is fed directly into the inverting input of operational amplifier 1200. The net result is that the inverting input of operational amplifier 1200 sees only the difference between the logs of the illumination sensed by sensor 1124 and the illumination sensed by sensor 1172.

The flasher described in FIGS. 4, 5, 6 and 7 above, exposes one sensed area to twice as much illumination as the other sensed area. This means that the log difference in exposure is 0.301 on the standard H&D curve. Thus the output of operational amplifier 1200 is proportional to gamma. By selecting components used with operational amplifier 1200, gamma can be made to appear directly as a voltage at output terminal 1214.

The output of operational amplifier 1200 being equal to gamma, operational amplifier 1220, and its associated biasing resistor 1218, perform the function of subtracting "1" from the value of gamma. Potentiometer 1210 is adjusted so the current flowing through it is equal to the current passing through resistor 1218. This normalizes the value of gamma and results in no current flow being present at the inverting input of operational amplifier 1220. After this normalization has been accomplished, any deviation from reference gamma results in an output from operational amplifier 1220. The deviation in gamma that is output from operational amplifier 1220 passes through amplifiers 1244 and 1230, which produce the absolute value of the deviation. The absolute value of the deviation is then presented as an input to the inverting input of operational amplifier 1302. The deviation from gamma determined by operational amplifier 1220 and the absolute value thereof resulting from the operations of 1230 and 1244 is the gamma term of the PQF equation.

The PQF equation sums both the gamma portion and the density portion to zero when the processor is operating optimally. The reader has circuitry capable of developing deviation from referenced density as an absolute value and presenting it to amplifier 1302. This is accomplished by taking the output of log amplifier 1126 and normalizing the density by setting the current flowing through potentiometer 1250 equal to the current flowing through resistor 1254. Thus when there is no deviation from optimum conditions, no current will be presented to the inverting input of operational amplifier 1252. The output of operational amplifier 1252 is the deviation of the density term of the PQF equation and amplifiers 1268 and 1264 act to produce the absolute value of the deviation and density, just as amplifiers 1244 and 1230 produce the absolute value of the deviation and gamma. The output of amplifiers 1244 and 1230 is presented as an input to the inverting input of operational amplifier 1302.

Thus the inverting input of operational amplifier 1302 sees the sum of the absolute values of the deviation in gamma and the deviation in density read by the reader. The output of amplifier 1302 is PQF.

Selector switch 1146 allows any one of a plurality of inputs to be selected. Thus the reader can measure density directly and as base-plus-fog, and can calculate gamma and PQE.

To read base-plus-fog the selector switch is moved to the base-plus-fog position or to the D1 position. In this position the instrument senses the density present in the portion of film directly beneath sensor 1124. The film is then moved until a blank portion of film is under this sensor. The density reading at this point is base-plus-fog.

PHYSICAL DESCRIPTION OF THE READER

Figure 12:
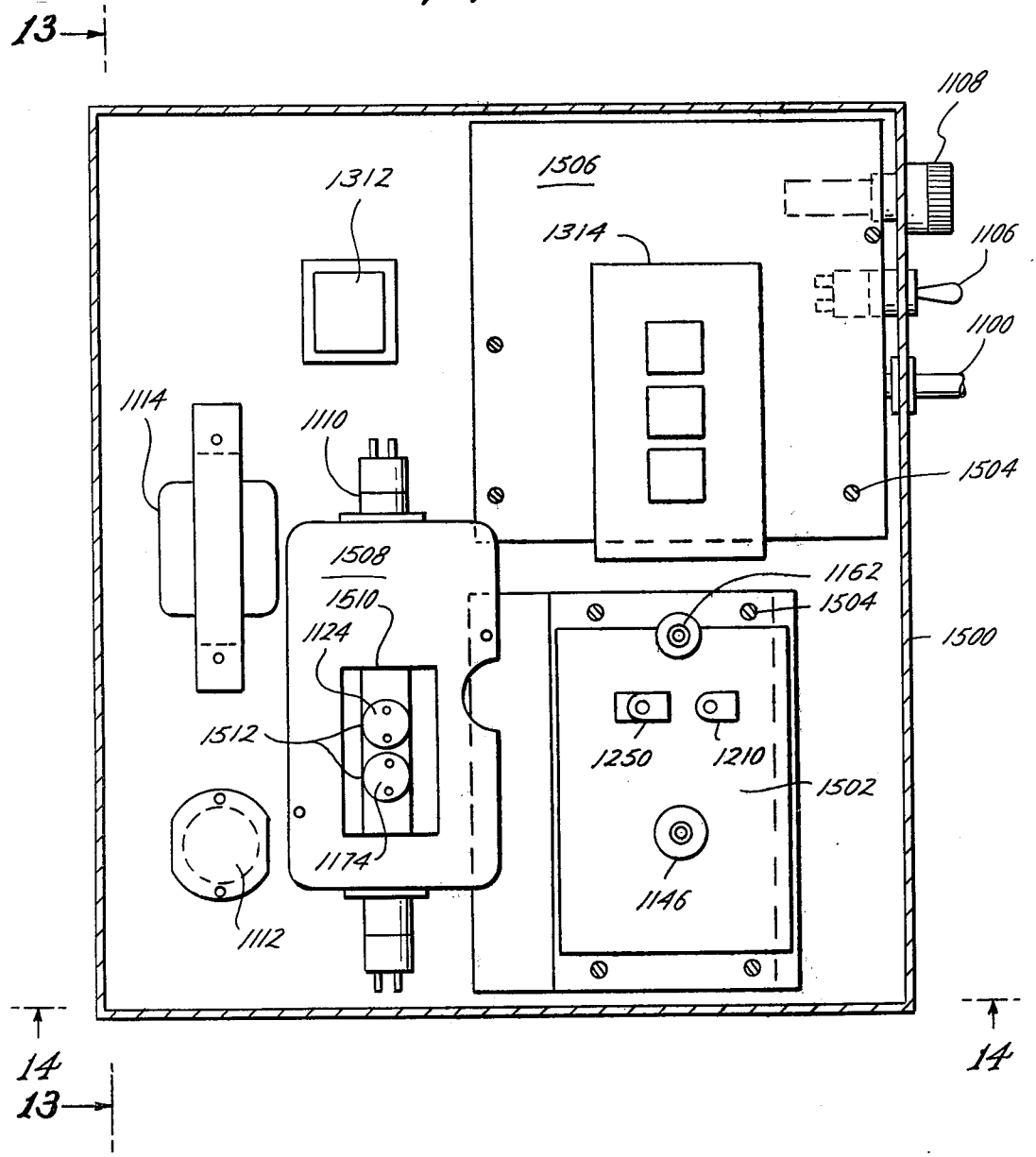
FIG. 12 is a top view of the reader apparatus taught by the preferred embodiment of the present invention.

FIG. 12 is a partially cut-away top view of the physical layout of the film reader constructed according to the preferred embodiment of the present invention.

Casing 1500 is penetrated by power cord 1100, switch 1106, and fuse 1108. Within housing 1500, printed circuit board 1502 is attached to the top of housing 1500, not shown, by threaded spacers and screws 1504. Printed circuit board 1506 is also attached by threaded standoff screws 1504 and a portion of the housing beneath digital panel meter 1314.

Ballast transformer 1114 and fluorescent tube starter 1112 are also affixed by screws to the underside of the housing cover of housing 1500.

Integrating cavity 1508 is provided with an opening block 1510 equipped with depressions adapted to hold sensors 1124 and 1174. Blue glass filters 1512 approximately ¼" in diameter fit between the front of sensors 1124 and 1174 and the interior of radiant cavity 1508.

Although generally even illumination is necessary for the reader's proper operation, the illumination of both spots should be of the same relative intensity and should be diffuse, thus attenuation tubes are not used in the reader.

Case 1500 may be made of any suitable material such as aluminum. The printed circuit boards and mounting means utilized by the present invention are all commercially available and well known to those skilled in the art of building electronic equipment. The integrating cavity may be made of plastic or any other suitable material and is coated with a diffusion coating.

FIG. 13 shows a partially cut-away front view of the reader taken along lines 13—13 of FIG. 12. Like members to denote like structures.

Case 1500 has a lower top 1514 and an upper top 1516. As in the flasher, these tops abut closely everywhere except where they have been formed to provide a slit 1518 that allows the entry of the film to be read. This slit is formed such that the areas exposed by the light attenuation tubes in the flasher will be brought into exact register under sensors 1124 and 1172 when the film is inserted in slit 1518 of the reader.

Selector switch 1146 is provided with knob 1520 and ten-turn potentiometer 1172 is provided with knob 1522. The reader is also provided with feet 1524, to keep it from scratching furniture.

Lower top 1514 of the reader is provided with a stepped cavity 1526 from the interior of radiant cavity 1508 to film plane 1518. The film being read fits between the upper portion of this stepped cavity and blue glass filter 1512 in well 1530. Detector 1124 and 1172 are inserted in the well and sit on top of filters 1512. The purpose of filters 1512 is to allow the reader to detect the same spectrum as would be seen by a radiologist reading the film. Thus the density and contrast levels measured by the reader correspond to the density and contrast levels that would be observed in a clinical situation by a practicing radiologist.

FIG. 14 is a partially cut-away side view of the reader taught by the preferred embodiment of the present invention taken along lines 14—14 of FIG. 12. Here like numbers denote like structures. The purpose of this drawing is to illustrate the geometrical arrangement of detector 1172 and well 1520 as it lies over filter 1512 in upper cover 1516. Slot 1518 is clearly shown and illustrates that the present invention provides registration on two axes of motion. It should be noted that the radiant cavity 1508 is directly affixed to the underside of lower cover plate 1514, there being no need for attenuating tubes in the reader.

OPERATION OF THE READER

1. Normal Operation

In normal operation a technician places exposed film or test film into the flasher and places the patient I.D., shown in FIG. 3, on the film at the same time. The technician then flashes the patient I.D. and the reference dots simultaneously.

Removing the exposed film from the flasher unit of the present invention, the technician processes the film normally, then inserts the developed film into the reader unit. The film is registered in the reader unit so the areas exposed by the flasher are under the sensors of the reader. The reader then automatically calculates and displays on command the process quality factor reading for that radiograph. As was discussed above, the process quality factor gives a highly sensitive and immediate indication of any deviation from optimized processor conditions. Basically the PQF reading calculates the gamma and speed for the film and then compares these with the gamma and speed of the referenced film and processor and shows any changes of percent deviation from the referenced conditions.

The radiology department of a using institution can then assign limits on percent deviation and determine what actions the technician should take at various cut off points. Should the deviation be serious, the technician may call for assistance from the chief technician or the scientific staff. Those personnel can now use the gamma reader as a precision diagnostic instrument. On command the reader will calculate and digitally display the sensiometric parameters of actual film gamma, base-plus-fog, actual densities, and PQF. With this data, the chief technician can isolate the probable cause to determine if there was a change in processor performance, if the film itself was out of specified tolerances, or if the patient film was underexposed or overexposed. Thus the present invention allows the quality control loop to be closed and provides precision monitoring at each step from the time the patient is exposed to the time the developed radiograph is in the hands of the radiologist. The total system requires less than 10 seconds per film of technician's time to implement. This 10 seconds includes the time that would normally be used anyway in flashing the patient data on the I.D. field. The patient has received maximum protection from excessive or repeated radiation dosage and the radiologist has received the highest quality radiograph that can be produced by the system.

2. Initial Calibration

The internal calibration of the reader may be confirmed by first adjusting potentiometer 1162 so digital panel meter 1314 reads "0" when the selector switch is set so digital panel meter 1314 is displaying the number one sensor density reading. Pre-flashed test film may be supplied with the unit. Such pre-flashed test film could then be inserted into the reader and the values of gamma, density sensed by sensor 1124, and density sensed by sensor 1172, are then read and verified against the information included with the test film. The flasher unit's light source is self-compensating and essentially self-calibrating. The integrating photometer of the flasher measures the intensity of the light source and integrates this during exposure. The logarithm of this exposure is then compared with the log relative exposure set into thumbwheel switches 264 and 304, which depend on the type of film being flashed. Exposure repeatability is accurate to a standard deviation of less than 0.005 for a log exposure below thumbwheel switch setting 1.00. Should the light source fall below a predetermined trigger point, the circuit will not fire and the light source should be replaced.

To standardize the system comprising the reader and flasher, the technician operator sets the log relative exposure switch of the flasher to obtain a desired density of one. This information may be supplied on various films. This step places the two reference densities within the linear portion of the HD curve of the film. The technician then flashes and processes the referenced film in a processor that has been optimized to serve as the reference processor for the facility.

The reference film is then placed in the reader and the density value verified by setting selector switch 1146 on density, number one sensor, and pressing momentary contact button 1312. Holding the switch closed with the mode switch in the PQF position, the digital indicator is nulled to "0" by alternately adjusting the gamma and density reference pots, which are potentiometers 1210 and 1250, respectively.

The entire operating system is now referenced to the new film type and the standard reference processor. Radiographically exposed film may now be sensiometrically exposed by the flasher, developed by the processor, and then evaluated by the reader. The PQF reading displayed by the reader will be a percentage of deviation from referenced conditions. By changing the setting of selector switch 1146 the operator can display digitally the discrete sensiometric variables of gamma, the two referenced densities, base-plus-fog and PQF.

The present invention is now ready for use. In general, the operating technician uses the invention as follows:

1. Check on proper x-ray radiation exposure of the patient.

If the radiology technician is giving the patient an excessive x-ray dosage, the PQF reading will be within normal limits but the developed film image will be too dark. If the radiology technician is giving the patient too little x-ray technique, the PQF reading will be normal but the developed x-ray film image will be too light to be diagnostically acceptable. This will require a retake and additional dosage of the patient.

2. Check on the film quality of a new batch of film.

It is not uncommon for a bad batch of film to cause retake after retake before the problem is identified. To properly evaluate this condition, the radiology department should have set aside known, high quality test film of the same manufacturer and type as the film used in normal operation. If the PQF reading suddenly goes bad, but the test film run through the system has a good PQF reading, a bad film batch is identified.

3. Monitor automatic film processor.

This can be done either on-line of off-line. In the on-line application, each film exposed by x-ray radiation is monitored by the invention and the PQF reading for each film is displayed to the operator. In the off-line application, test films are monitored periodically instead of each film being monitored. The invention is easily standaridized against an optimum processor and/or a new film type and is nulled so that PQF reads "zero". In operation, the PQF reading is given as a percentage of deviation from an optimum processor and the particular film type. The allowable percent deviation is established by the radiology department of the particular facility. Generally, a processor that is malfunctioning will show fluctuations and a degradation trend before it goes out of acceptable limits. A poorly functioning processor is identified when the PQF reading goes bad on the operational films and when a test confirms about the same poor PQF reading.

The above detailed embodiment is intended to be illustrative of the present invention, but should not limit it. The scope of the present invention should only be limited by the scope of the appended claims and their equivalents.

I claim:

1. A radiographic imaging quality monitor system comprising:

first exposure means for exposing a portion of a photosensitive material to a first intensity of even illumination, second exposure means for exposing a second portion of said photosensitive material to a second intensity of even illumination, measuring means including only a single light source for measuring the developed density of the first and second portion of said photosensitive material, signal processing means responsive to said measuring means for simultaneously evaluating the density of said first portion and said second portion, display means responsive to said signal processing means for displaying the density of said first and second portions.

2. A system as in claim 1 wherein:

said signal processing means determines gamma and process quality factor, and said display means selectively displays gamma and process quality factor.

3. A system as in claim 2 wherein said first and said second intensity are both chosen so their respective exposure means produce exposures on the linear portion of said photosensitive material's D-log E curve, said exposures differing by a constant amount.

4. A radiographic imaging quality monitor system comprising:

first and second exposure means for exposing a first and second portion, respectively, of a photosensitive material to attenuated light from a single light source, said first exposure means producing a first level of illumination chosen to produce a first exposure on the linear portion of said photosensitive material's D-log E curve and said second exposure means producing a second level of illumination chosen to produce a second exposure on the linear portion of said photosensitive materials D-log E curve, said first exposure and said second exposure differing by a constant amount, measuring means including only a single light source for measuring the developed density of said first and said second portion of said photosensitive material, signal processing means responsive to said measuring means for simultaneously evaluating the densities of said first portion and said second portion and to calculate gamma and processor quality factor (PQF), display means responsive to said signal processing means for selectably displaying density, gamma or process quality factor (PQF).

5. A system as in claim 4 wherein reference density and reference gamma are set in said signal processing means as constants by measuring a reference film from a reference processor and adjusting said signal processing means to a null output for said reference gamma and density, whereby said display means displays a non-null output only if said measuring means detects a deviation from said reference values of gamma and density in a sensed photosensitive material.

6. A system as is claim 4 wherein said signal processing means calculates processor quality factor by the equation $$PQF = K_2 \left| \frac{\text{density measured}}{\text{density reference}} - 1 \right| + K_1 \left| \frac{\text{gamma measured}}{\text{gamma reference}} - 1 \right|$$

where $K_1$ and $K_2$ are weighing factors.

7. A system as in claim 6 wherein said first and second exposure means comprise a radiant cavity containing a light source, at least two attenuation tubes in visual communication with said radiant cavity, at least one said light barrel having at least one internal annular light light barrel, and holding means for placing the end of said light attenuating tubes opposite said radiant cavity proximate the surface of said photosensitive material, said measuring means comprises, a source of even illumination on one side of said developed density, two photocells held in register so as to sense the developed densities produced by said first and second exposure means, said photocells being held on the opposite side of said photosensitive material from said source of illumination, said signal processing means comprises electronic means responsive to the output of said photocells and to the reference settings of the gamma and density references for producing voltage outputs corresponding to the density sensed by either of the photocells, the gamma of the photosensitive material and the processor quality factor of the photosensitive material; and said display means comprises a voltmeter selectably switchable to each of the outputs of said signal processing means.

8. A system as in claim 7 wherein the light output of the radiant cavity is filtered to produce a spectrum similar to the sensitivity spectrum of the photosensitive material, and the light striking the photocells of the measuring means is filtered to produce an equal energy spectrum equivalent to that sensed by the human eye.

9. A system as in claim 8 wherein said light in said radiant cavity is sensed by a sensing means and the sensed exposure is measured by an exposure processor that stops the exposure when it reaches a preset value.

10. A sytem as in claim 9 wherein said preset value is chosen to place the first and second exposure on the linear portion of the D-log E curve of the photosensitive material.

11. A system as in claim 10 wherein the radiant cavity is replaced by an electroluminescent panel.

12. A system as in claim 11 wherein said baffle have annular focus rings mounted medially between said radiant cavity and said photosensitive material, said tubes being threaded and anodized dull black to generate illumination of uniform radial intensity.

* * * * *